(12) United States Patent
Yoshida et al.

(10) Patent No.: US 8,454,079 B2
(45) Date of Patent: Jun. 4, 2013

(54) STRENGTH MEMBER FOR AN AUTOMOBILE BODY, FRONT SIDE MEMBER, AND SIDE STRUCTURE FOR AN AUTOMOBILE BODY

(75) Inventors: Michitaka Yoshida, Amagasaki (JP); Nobusato Kojima, Amagasaki (JP); Atsushi Tomizawa, Minou (JP); Naoaki Shimada, Osaka (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 13/397,335

(22) Filed: Feb. 15, 2012

(65) Prior Publication Data

US 2012/0267919 A1 Oct. 25, 2012

Related U.S. Application Data

(60) Division of application No. 12/572,625, filed on Oct. 2, 2009, now Pat. No. 8,136,871, which is a continuation of application No. PCT/JP2008/056371, filed on Mar. 31, 2008.

(30) Foreign Application Priority Data

Apr. 4, 2007 (JP) ................................. 2007-098730

(51) Int. Cl.
*B62D 21/15* (2006.01)
(52) U.S. Cl.
USPC .................. 296/187.09; 296/205; 296/203.02
(58) Field of Classification Search
USPC .................. 296/203.01, 205, 203.02, 193.09, 296/187.09, 187.03
See application file for complete search history.

(56) References Cited

U.S. PATENT DOCUMENTS

| | | | |
|---|---|---|---|
| 6,015,182 A | 1/2000 | Weissert et al. | |
| 6,227,609 B1 | 5/2001 | Mellis | |
| 6,948,749 B2 | 9/2005 | Graber | |
| 7,066,552 B2 | 6/2006 | Yoshida | |
| 7,172,238 B2 | 2/2007 | Bodin et al. | |
| 7,678,208 B2 * | 3/2010 | Bodin ........................... | 148/648 |
| 2007/0102955 A1 | 5/2007 | Bodin et al. | |

FOREIGN PATENT DOCUMENTS

| | | |
|---|---|---|
| JP | 50-59263 | 5/1975 |
| JP | 7-119892 | 5/1995 |
| JP | 10-45023 | 2/1998 |
| JP | 2816000 | 10/1998 |
| JP | 11-255146 | 9/1999 |
| JP | 2000-158048 | 6/2000 |
| JP | 2001-106002 | 4/2001 |

(Continued)

*Primary Examiner* — Jason S Morrow
(74) *Attorney, Agent, or Firm* — Clark & Brody

(57) ABSTRACT

A front side member having a single body formed from a tubular body having a closed cross section has a front portion which extends in the fore and aft direction of a vehicle body, a sloping portion which is continuous with the front portion and slopes downwards along a dash panel, and a rear portion continuous with the sloping portion and extending along the bottom surface of a floor panel joined to the dash panel. A portion of the front portion is an unquenched portion which has not undergone quenching treatment and the remainder is a high frequency quenched portion which has undergone high frequency quenching. The sloping portion is a high frequency quenched portion. A portion of the rear portion is an unquenched portion which has not undergone quenching and the remainder other than that portion is a high frequency quenched portion which has undergone high frequency quenching.

15 Claims, 27 Drawing Sheets

FOREIGN PATENT DOCUMENTS

| | | |
|---|---|---|
| JP | 3195083 | 8/2001 |
| JP | 2002-20853 | 1/2002 |
| JP | 2002-173055 | 6/2002 |
| JP | 2003-118633 | 4/2003 |
| JP | 2003-306171 | 10/2003 |
| JP | 2004-82861 | 3/2004 |
| JP | 2004-114912 | 4/2004 |
| JP | 2004-323967 | 11/2004 |

* cited by examiner (a)

(b)

(inner side) (outer side)

STRENGTH MEMBER FOR AN AUTOMOBILE BODY, FRONT SIDE MEMBER, AND SIDE STRUCTURE FOR AN AUTOMOBILE BODY

TECHNICAL FIELD

This invention relates to a strength member for an automobile body, a front side member, and a side structure for an automobile body. More particularly, the present invention relates to a strength member for an automobile body which is manufactured by carrying out bending in which the bending direction varies two-dimensionally such as S-bending or bending in which the bending direction which varies three-dimensionally, a front side member which is a strength member of an automobile body, and a side construction of an automobile body, and specifically a side structure of an automobile body having an A-pillar, a B-pillar, and a roof rail side member.

BACKGROUND ART

In the past, automobiles employed a so-called frame construction in which parts such as an engine, a radiator, a suspension, a transmission, a differential, a fuel tank, and the like were mounted on a frame formed by assembling members with a box-shaped cross section in the form of a ladder, and then mounting a body having an engine compartment, a passenger compartment, and a trunk atop the body. However, a frame construction always uses a heavy frame which is a separate member from the body, so it is difficult to decrease the weight of the body. In addition, since a process of joining the frame to the body is unavoidable, productivity is poor. Therefore, almost all automobiles manufactured in recent years have a monocoque body (unit construction body) in which the frame and the body are integral with each other.

A monocoque body supports a load atop an integral body shell comprising a body side formed by combining a side sill, an A-pillar, a B-pillar, a roof rail side member, and in some cases a C-pillar with an underbody (also referred to as a platform) which is the most important part and forms the base of the body structure and is the bottom surface, namely the floor portion of a monocoque body. When portions of the body contract or collapse under an externally applied impact load, the impact energy is absorbed by the body parts as a whole.

A monocoque body does not have a clearly defined frame as is the case with a frame construction, but in portions where loads and stress concentrate such as mounting portions for the engine and a suspension, the body shell is reinforced by suitable installation of automobile body strength members formed from tubular members with a closed cross section such as side members, suspension members, various pillars, cross members, roof rail side members, and side sills. The body side and the underbody not only greatly affect the bending stiffness and torsional stiffness of an automobile body, but at the time of a side impact, they have the function of minimizing damage to the passenger compartment and increasing the safety of passengers. In particular, compared to a front impact, it is difficult to adequately guarantee space for protecting passengers during a side impact, so it is important to increase the stiffness of the body side.

Among strength members which are disposed in this manner are "side members" (also referred to as the subframe). These members form the skeleton which is interposed when mounting the suspension, the engine, the transmission, or the like on the underbody. The underbody greatly affects the various types of stiffness (such as the bending stiffness and the torsional stiffness) of the body for supporting the suspension and the drive train, so by suitably installing side members and other reinforcing members in various portions of the underbody, the underbody is given sufficient stiffness. One such side member is a front side member which extends generally horizontally in the fore and aft direction on the left and right sides of the engine compartment and is welded in place.

Normally, a front side member has a body comprising a tube having a closed cross section having a shape such as a rectangle, a hexagon, a circle, or the like. The body has a front end portion which extends in the axial direction of the body from one end of the body towards the other end of the body in the fore and aft direction of the vehicle body, a sloping portion which is continuous with the front end portion and which is sloped along the dash panel which is a wall between the engine compartment and the passenger compartment, and a rear end portion which is continuous with the sloping portion and extends along the floor panel is connected to the dash panel. Although it depends upon the size of the vehicle body, the overall length of the front side member is around 600-1200 mm.

As stated above, a front side member is a strength member, the most important requirement of which is to maintain the strength of the underbody. Therefore, it is designed so as to have adequate strength. It is also the main member which bears an impact load applied at the time of a front impact collision. Accordingly, it is designed so that if a front impact collision occurs, it has impact absorbing properties such that it can absorb impact energy by plastic deformation of its front end by buckling into an accordion shape. In this manner, a front side member must have the mutually opposite properties that it have adequate strength and that its front end portion easily undergo plastic deformation into the shape of an accordion when an impact load is applied.

As stated above, a front side member is welded to other panels as a reinforcing member for the underbody, so it is also required to have excellent weldability and excellent workability such that it can have a complicated shape from its front end portion to its rear end portion and such that it can be subjected to punching or cutting.

Patent Document 1 discloses an invention pertaining to an energy absorbing member which comprises a hollow aluminum alloy extrusion having a plate thickness which locally varies. Patent Document 2 discloses an invention pertaining to a front side member which has a closed cross section with an arch-shaped portion disposed parallel to the fore and aft direction of a vehicle body and which has a plate thickness which locally varies. Patent Document 3 discloses an invention pertaining to a front side member having a weak portion provided in its front end portion. Patent Document 4 discloses an invention pertaining to a front side member in which the shape of its front end portion is such that it can more uniformly deform by buckling over its entire cross section. Patent Document 5 discloses an invention pertaining to a front side member having a closed cross section and comprising a lower member with a U-shaped cross section comprising a casting of a light alloy and an upper member comprising a plate of a light alloy.

Patent Document 6 discloses an invention which prevents buckling of the A-pillar at the time of rollover by installing a reinforcing tube inside the A-pillar for the body side.

In recent years, there has been an increasing demand for decreases in weight and increases in strength of strength members for automobile bodies in order to increase fuel efficiency so as to decrease discharge of $CO_2$ in order to suppress global warming as well as to increase the safety of passengers at the time of a collision. In order to cope with such demands, high strength materials such as high tensile strength steel plates having a tensile strength of at least 780 MPa or even at least 900 MPa which is considerably higher than conventional strength levels are now much used.

At the same time that such materials are being increased in strength, the structure of strength members for automobile bodies is being reconsidered. For example, in order to enable application to various automobile parts, there is a strong demand for the development of bending techniques which can work strength members for automobile bodies having a widely varying bent shape such as those which are manufactured by bending with a bending direction which varies 2-dimensionally such as S-bending or bending with a bending direction which varies three-dimensionally with high accuracy.

Various working techniques have been proposed in order to cope with such demands. For example, Patent Document 7 discloses an invention pertaining to a method of bending while performing heat treatment of a metal pipe or the like by gripping the end portion of a material being worked such as a metal pipe with a rotatable arm, and while heating with a heating device, gradually moving the heated portion in the axial direction to produce bending deformation and then immediately thereafter performing cooling. Patent Document 8 discloses an invention pertaining to a method of bending while performing heat treatment of a metal pipe or the like by gripping a metal pipe and applying a twisting force and a bending force to a heated portion carry out bending deformation while twisting the metal pipe.

Taking into consideration decreases in the weight of products Mimed by bending (referred to below as bent products), the tensile strength of the products is preferably set to be at least 900 MPa and more preferably at least 1300 MPa. Up to now, in order to achieve such a strength, as disclosed in Patent Documents 7 and 8, a pipe having a tensile strength of 500-700 MPa was used as a starting material and subjected to bending, after which its strength was increased by heat treatment to manufacture a bent product having a desired high strength.

The inventions disclosed in Patent Documents 7 and 8 both use working method classified as so-called grip bending. In order to carry out either invention, it is necessary to grip the end of a material being worked with a rotatable arm. Furthermore, each time the material being worked is regripped by the arm, it is necessary to return the aim to its original position, so the feed speed of the material being worked greatly varies, it becomes difficult to perform complicated control of the cooling rate, and a desired quenching accuracy cannot be obtained. Therefore, the speed of heating and cooling must be controlled in a complicated manner and which high accuracy in order to produce non-uniform strains, and it is extremely difficult to obtain a desired quenching accuracy. Therefore, variations in the bent shape develop, and particularly in the case of high strength materials, delayed fracture caused by residual stresses develop, and it is difficult to manufacture a strength member for automobiles requiring high reliability.

Patent Document 9 discloses an invention pertaining to a bending apparatus with high frequency heating in which a material to be worked which is supported by a support means is fed from an upstream side towards a downstream side by a feed device while bending is carried out downstream of the support means, and a roller is supported so as to move three-dimensionally. According to the bending apparatus with high frequency heating disclosed in Patent Document 9, the roller straddles the material being worked and moves to opposite side surfaces of the material being worked, contacts the side surfaces, and performs bending. Therefore, even when bending is carried out in which the bending direction varies two-dimensionally such as with S-bending, it is no longer necessary to perform a tooling operation of rotating the material being worked by 180 degrees, so working can be efficiently carried out.

However, the bending apparatus with high frequency heating disclosed in Patent Document 9 does not have any means for clamping the material being worked on both sides. Therefore, deformation caused by residual stress due to cooling after high frequency heating easily develops, which makes it difficult to obtain a desired dimensional accuracy In addition, the working speed is limited, and it is difficult to increase the degree of bending.

Patent Document 10 discloses an invention pertaining to a bending apparatus which in place of the above-described gripping working or roller of a bending apparatus with high frequency heating provides a fixed die installed in a fixed position and a movable gyro-die which is spaced from the fixed die and can move three-dimensionally. A heating means heats a metal material to a temperature corresponding to the bending curvature of a metal material by the movable gyro-die.

Patent Document 1: JP 10-45023 A
Patent Document 2: JP 11-255146 A
Patent Document 3: JP 2001-106002 A
Patent Document 4: JP 2002-173055 A
Patent Document 5: JP 2003-306171 A
Patent Document 6: JP 2003-118633 A
Patent Document 7: JP 50-59263 A
Patent Document 8: Japanese Patent No. 2816000
Patent Document 9: JP 2000-158048 A
Patent Document 10: Japanese Patent No. 3195083

DISCLOSURE OF THE INVENTION

Problem Which the Invention is to Solve

The prior art inventions disclosed in Patent Documents 1-5 each attempt to obtain a high strength and excellent ability to absorb impacts by giving a front side member a special structure, so there is a limit to the extent to which they can achieve further increases in strength and decreases in weight as well as increases in impact absorbing properties.

The prior art invention disclosed in Patent Document 6 can in fact prevent buckling of an A-pillar at the time of rollover, but it cannot be said to guarantee sufficient space within a passenger compartment at the time of a side impact, so that invention needs improvement from the standpoint of increasing safety.

Neither the fixed die nor the movable gyro-die which form the bending apparatus disclosed in Patent Document 10 hold a metal material being worked so that it can rotate. Therefore, seizing scratches readily develop in the surfaces of both the fixed die and the movable gyro-die when holding the metal material. The bending apparatus disclosed in Patent Document 10 supplies a cooling fluid to the fixed die and the movable gyro-die in order to prevent a decrease in the strength of the dies or a decrease in working accuracy due to thermal expansion. However, supply of the cooling fluid is not for the purpose of quenching the metal material undergoing bending, so it is not possible to manufacture a bent product having a high strength such as at least 900 MPa by carrying out quenching at the time of working.

Although the bending apparatus disclosed in Patent Document 10 is based on bending, it is not intended to obtain a high strength metal material by using a low strength metal pipe as a starting material, performing hot working and then quenching to increase the strength. In addition, during heating of the metal material, galling scratches easily develop on the surface of the movable gyro-die. Accordingly, there is a need for further improvements in that bending apparatus.

In light of the problems of such prior art, the object of the present invention is to provide a strength member for an automobile body, a front side member, and a side structure for an automobile body, and specifically to provide a strength member for an automobile body which is manufactured by carrying out bending with a bending direction which varies two-dimensionally such as S-bending or a bending direction which varies three-dimensionally, a front side member which is a strength member of an automobile body, and a side structure for an automobile body and specifically a side structure for an automobile body having at least an A-pillar, a B-pillar, and a roof rail side member.

Means for Solving the Problem

As a result of diligent investigation with the object of solving the above-described problems, the present inventors made the below-described findings (a)-(d) and completed the present invention.

(a) If a bending apparatus having a particular structure is used, a strength member for an automobile body having a body comprising a tubular body constituted by a single member in the axial direction and having a portion which has undergone high frequency quenching and which has ultrahigh strength such as at least 1100 MPa and preferably at least 1500 MPa can actually be mass produced on an industrial scale.

(b) If a front side member is manufactured using a bending apparatus having a particular structure, a front side member can be provided which is constituted by a single member in the axial direction and which locally has a portion which has undergone high frequency quenching which has not previously existed, and as a result, an increase in the strength and a decrease in the weight of a front side member as well as an increase in impact absorbing properties can both be achieved to a higher degree than has thus far been possible.

(c) If one manufactures a side portion reinforcing member which is constituted by a single member in the axial direction and which locally has portions which have undergone high frequency quenching which have not existed thus far and which is disposed inside an A-pillar or a roof side member or the like constituting a body side using a bending apparatus having a particular structure, a body side of higher strength can be achieved As a result, an increase in the space inside a passenger compartment at the time of a collision, a decrease in weight due to a decrease in the cross-sectional dimensions of the side reinforcing member itself, and a decrease in manufacturing costs due to a decrease in the number of parts due to integrating the structure of the side reinforcing member can be achieved.

(d) The above-described reinforcing member for an automobile body, front side member, and side reinforcing member are constituted by a single member in the axial direction and locally have an ultrahigh strength portion which has been subjected to high frequency quenching, and they have a tubular body with a closed cross section. Therefore, a low weight, high strength, excellent impact absorbing properties, a decrease in the number of parts, and a decrease in manufacturing costs which could not be obtained in the past can be obtained to a high degree.

Although it does not relate to a front side member or a body side, JP 10-17933A discloses an invention pertaining to B-pillar reinforcement which improves properties by locally carrying out high frequency quenching. However, in that document, there is no disclosure or suggestion that the various properties required of a front side member or a body side can be greatly improved by performing high frequency quenching of a front side member or a body side, or that a front side member or a body side which can actually be manufactured can be provided. That document only discloses a member which can increase the stiffness of a B-pillar.

The present invention is a strength member for an automobile body having a tubular body which is constituted by a single member in the axial direction and which has a closed cross section and which has a bent portion which is bent two-dimensionally or three-dimensionally, characterized in that the tubular body has an ultrahigh strength heat-treated portion which has been heat treated so as to have a tensile strength exceeding 1100 MPa, and a high strength heat-treated portion which is the remainder of the body other than the ultrahigh strength heat-treated portion and which has been heat treated so as to have a tensile strength of at least 600 MPa and at most 1100 MPa.

The present invention is also a strength member for an automobile body having a tubular body which is constituted by a single member in the axial direction and which has a closed cross section and which has a bent portion which is bent two-dimensionally or three-dimensionally, characterized in that the tubular body has an ultrahigh strength heat-treated portion which has been heat treated so as to have a tensile strength exceeding 1100 MPa, and a low strength heat-treated portion which is the remainder of the body other than the ultrahigh strength heat-treated portion and which has been heat treated so as to have a tensile strength of less than 600 MPa.

The present invention is also a strength member for an automobile body having a tubular body which is constituted by a single member in the axial direction and which has a closed cross section and which has a bent portion which is bent two-dimensionally or three-dimensionally, characterized in that the tubular body has an ultrahigh strength heat-treated portion which has been heat treated so as to have a tensile strength exceeding 1100 MPa, a high strength heat-treated portion which is a portion of the remainder of the body other than the ultrahigh strength heat-treated portion and which has been heat treated so as to have a tensile strength of at least 600 MPa and at most 1100 MPa, and a low strength heat-treated portion which is the remainder of the body other than the ultrahigh strength heat-treated portion and the high strength heat-treated portion and which has been heat treated so as to have a tensile strength of less than 600 MPa.

The present invention is also a strength member for an automobile body having a tubular body which is constituted by a single member in the axial direction and which has a closed cross section and which has a bent portion which is bent two-dimensionally or three-dimensionally and at least one of a portion to be cut, a portion to be punched, and a portion to be welded, characterized in that the tubular body has an ultrahigh strength heat-treated portion which has been heat treated so as to have a tensile strength exceeding 1100 MPa, a high strength heat-treated portion which is a portion of the remainder of the body other than the ultrahigh strength heat-treated portion and which has been heat treated so as to have a tensile strength of at least 600 MPa and at most 1100 MPa, and a low strength heat-treated portion which is the remainder of the body other than the ultrahigh strength heat-treated portion and the high strength heat-treated portion and which has been heat treated so as to have a tensile strength of less than 600 MPa.

The present invention is also a strength member for an automobile body having a tubular body which is constituted by a single member in the axial direction and which has a closed cross section and which has a bent portion which is bent two-dimensionally or three-dimensionally and at least one of a portion to be cut, a portion to be punched, and a portion to be welded, characterized in that the tubular body has an ultrahigh strength heat-treated portion which has been heat treated so as to have a tensile strength exceeding 1100 MPa, a first low strength heat-treated portion which is at least one of the portion to be cut, the portion to be punched, and the portion to be welded and which has been heat treated so as to have a tensile strength of less than 600 MPa, and a second low strength heat-treated portion which is the remainder of the body other than the ultrahigh strength heat-treated portion and the first low strength heat-treated portion and which has been heat treated so as to have a tensile strength of less than 600 MPa.

The present invention is also a strength member for an automobile body having a tubular body which is constituted by a single member in the axial direction and which has a closed cross section and which has a bent portion which is bent two-dimensionally or three-dimensionally and at least one of a portion to be cut, a portion to be punched, and a portion to be welded, characterized in that the tubular body has an ultrahigh strength heat-treated portion which has been heat treated so as to have a tensile strength exceeding 1100 MPa, a first low strength heat-treated portion which is at least one of the portion to be cut, the portion to be punched, and the portion to be welded and which has been heat treated so as to have a tensile strength of less than 600 MPa, a high strength heat-treated portion which is a portion of the remainder of the body other than the ultrahigh strength heat-treated portion and the first low strength heat-treated portion and which has been heat treated so as to have a tensile strength of at least 600 MPa and at most 1100 MPa, and a second low strength heat-treated portion which is the remainder of the body other than the ultrahigh strength heat-treated portion, the high strength heat-treated portion, and the first low strength heat-treated portion and which has been heat treated so as to have a tensile strength of less than 600 MPa.

In a strength member for an automobile body according to the present invention, an example is given in which the bent portion is an ultrahigh strength heat-treated portion which has been heat-treated so as to have a tensile strength exceeding 1100 MPa.

In a strength member for an automobile body according to the present invention, the closed cross section preferably does not have an outwardly extending flange.

In the present invention, portions other than the ultrahigh strength heat-treated portion preferentially deform when an impact load is applied due to having a lower strength than the ultrahigh strength heat-treated portion so as to function as deformation-promoting portions with respect to an impact load. In the present invention, by providing these deformation-promoting portions, a mode of collapse or deformation suitable for the product can be achieved at the time of an impact load.

For example, when a strength member for an automobile body according to the present invention is a member such as a side member which receives crushing in the axial direction, by disposing deformation promoting portions alternatingly in the axial direction, the member undergoes buckling in the direction of application of an impact load and ultimately undergoes plastic deformation into an accordion shape, so absorption of energy can be increased. In addition, when a strength member for an automobile body according to the present invention is a member formed by three-point bending as is the case with various types of pillars, by making the bent portion an ultrahigh strength heat-treated portion and disposing the deformation promoting portions next to the ultrahigh strength heat-treated portion, buckling is suppressed on the inner periphery of the bent portion, and energy absorption can be further increased. The same effect can be achieved not only with three-point bending but with crushing in the axial direction.

Thus, by suitably positioning an ultrahigh strength heat-treated portion and a deformation-promoting portion while taking into consideration the shape of parts and the direction of input of a load, a strength member for an automobile body having increased energy absorption and high efficiency can be obtained.

From another standpoint, the present invention is a front side member having a body comprising a tubular body which has a closed cross section and which is constituted by a single member in the axial direction, the body having, from one end towards the other end in the axial direction thereof, a front portion (front end portion) which extends in the fore and aft direction of a vehicle body, a sloping portion which is continuous with the front portion and which slopes along a dash panel, and a rear portion (rear end portion) which is continuous with the sloping portion and which extends along the bottom surface of a floor panel which is joined to the dash panel, characterized in that a portion of the front portion is an unquenched portion which has not undergone quenching treatment and the remainder of the front portion other than the unquenched portion is a high frequency quenched portion which has undergone high frequency quenching, the entire sloping portion is a high frequency quenched portion which has undergone high frequency quenching, and the rear portion is entirely a high frequency quenched portion which has undergone high frequency quenching, or a portion of the rear portion is an unquenched portion which has not undergone quenching with the remainder of the rear portion other than the unquenched portion being a high frequency quenched portion which has undergone high frequency quenching.

In a front side member according to the present invention, preferably at least one of each of the unquenched portion and the high frequency quenched portion in the front portion are alternatingly disposed in the axial direction of the tubular body.

In a front side member according to the present invention, the axial length of each of the unquenched portion and the high frequency quenched portion preferably gradually increases from the front end towards the rear end of the tubular body.

In a front side member according to the present invention, preferably the high frequency quenched portion in the front portion gradually increases in area in the axial direction of the tubular body from the front end towards the rear end, and preferably the unquenched portion in the front portion gradually decreases in area in the axial direction of the tubular body from the front end towards the rear end.

In a front side member according to the present invention, preferably at least one of each of the unquenched portion and the high frequency quenched portion in the front portion are alternatingly disposed in the circumferential direction of the tubular body.

In a front side member according to the present invention, the tubular body preferably has a polygonal transverse cross-sectional shape, the unquenched portion is preferably provided in a region not including a vertex of the polygon, and the high frequency quenched portion is preferably provided in a region including a vertex of the polygon.

A tubular body according to the present invention preferably has a polygonal transverse cross section, an unquenched portion is preferably provided in a region including a vertex of the polygon, and a high frequency quenched portion is preferably in a region not including a vertex of the polygon.

In a front side member according to the present invention, the polygon preferably has a pair of opposing generally horizontal surfaces wherein an unquenched portion is preferably provided in one of the generally horizontal surfaces and a high frequency quenched portion is preferably provided in the other generally horizontal surface.

In a front side member according to the present invention, the polygon preferably has a pair of opposing generally vertical surfaces wherein an unquenched portion is preferably provided in one of the generally vertical surfaces and a high frequency quenched portion is preferably provided in the other of the generally vertical surfaces.

In a front side member according to the present invention, an unquenched portion is preferably provided in a region on the lower side of a transverse cross section of the tubular body, and a high frequency quenched portion is preferably provided in a region on the upper side excluding the region on the lower side.

In a front side member according to the present invention, an unquenched portion is preferably provided in a region on the inner side of the vehicle body in a transverse cross section of the tubular body, and a high frequency quenched portion is preferably provided in a region on the outer side of the vehicle body excluding the region on the inner side of the vehicle body.

In a front side member according to the present invention, preferably at least one of each of the unquenched portion and the high frequency quenched portion of the rear portion are alternatingly disposed in the axial direction of the tubular body from the front end of the rear portion.

In a front side member according to the present invention, the unquenched portion is preferably provided in a region including a punched portion which is subjected to punching and a welded portion which is welded.

In a front side member according to the present invention, the tubular body preferably does not have an outwardly-extending flange.

In a front side member according to the present invention, the tensile strength of the high frequency quenched portion is preferably greater than 1100 MPa or at least 600 MPa and at most 1100 MPa, and the tensile strength of the unquenched portion is preferably less than 600 MPa.

From another standpoint, the present invention is a side structure for an automobile body having an A-pillar having a first portion which has a closed cross section and which is connected to a side sill and extends upwards, and a second portion which has a closed cross section and which is continuous with the first portion and extends along a slope therefrom, and a roof rail side member which has a closed cross section and which is continuous with the A-pillar and is connected to a B-pillar, characterized in that a side reinforcing member which has a closed cross section and which has a shape which is bent three-dimensionally and which is constituted by a single member in the axial direction which has undergone high frequency quenching is disposed so as to extend at least inside the second portion of the A-pillar and inside the roof rail side member to be positioned to the rear of the connection with the B-pillar.

In a side structure for an automobile body according to the present invention, quenching is preferably not carried out in a region of the side reinforcing member which is welded for connection to the B-pillar.

In a side structure for an automobile body according to the present invention, the automobile body preferably has a C-pillar which is continuous with the roof rail side member and has a closed cross section, and the side reinforcing member is preferably disposed inside the C-pillar.

In a side structure for an automobile body according to the present invention, quenching is preferably not carried out on the front end of the side reinforcing member which is disposed inside the second portion of the A-pillar.

In a side structure for an automobile body according to the present invention, the side reinforcing member is preferably also disposed inside the first portion of the A-pillar.

In a side structure for an automobile body according to the present invention, the side reinforcing portion preferably does not have an outwardly-extending flange.

In a side structure for an automobile body according to the present invention, the tensile strength of a portion of the side reinforcing member which has undergone high frequency quenching is preferably greater than 1100 MPa or at least 600 MPa and at most 1100 MPa.

In a side structure for an automobile body according to the present invention, the tensile strength of a portion of the side reinforcing member which is not subjected to quenching is preferably less than 600 MPa.

A side reinforcing member for an automobile body, a front side member, and a side reinforcing member for a side structure of an automobile body according to the present invention are manufactured by a method of manufacturing a bent product using a bending method which carries out bending downstream of a support means while feeding a metal material to be worked (a starting material for a strength member for an automobile body, a front side member, or a side reinforcing member) with a feed device from an upstream side to a downstream side and supporting the metal material with the support means to manufacture a product intermittently or continuously having a bent portion which is bent two-dimensionally or three-dimensionally and a quenched portion in the lengthwise direction and/or the circumferential direction in a plane crossing the lengthwise direction. This method comprises locally heating a portion of the fed metal material to a temperature at which quenching is possible with a heating means for the metal material downstream of the support means and spraying a cooling medium towards the portion heated by the heating means with a cooling means disposed downstream of the heating means to quench at least a portion of the metal material, performing bending of the metal material which is fed in the axial direction by imparting a bending moment to the portion of the metal material which was heated by the heating means by two-dimensionally or three-dimensionally varying the position of a movable roller die having a plurality of rolls which can feed the metal material heated by the heating means in the axial direction, and suppressing errors in the product resulting from the bending by supporting a portion of the metal material which has passed through the movable roller die.

A strength member for an automobile body, a front side member, and a side reinforcing member in a side structure of an automobile body are manufactured in this manner, so the radius of curvature of a bent portion which is bent two-dimensionally or three-dimensionally can be made constant (such as the shape of a circular arc), or it can be made non-constant, namely, it can have a shape such that the radius of curvature varies with the position in the lengthwise direction.

Particularly with a strength member for an automobile body such as a front side member or various types of pillars, the radius of curvature of bent portions which bend three-dimensionally often varies in the lengthwise direction. Such a strength member for an automobile body can be provided by the present invention.

A strength member for an automobile body, a front side member, and a side reinforcing member in a side structure of an automobile body according to the present invention are manufactured using a manufacturing apparatus for manufacturing a bent product which intermittently or continuously has a bent portion which is curved two-dimensionally or three-dimensionally and quenched portion in the lengthwise direction and/or the circumferential direction in a plane crossing the lengthwise direction using a bending method which performs bending downstream of a support means while feeding a metal material which is a material being worked and which is supported by the support means from an upstream side towards a downstream side. The apparatus includes a heating means which surrounds the outer periphery of the metal material downstream of the support means and which is intended for locally heating a portion of the metal material to a temperature range in which quenching is possible, a movable roller die which has at least one set of rolls and is disposed downstream of the heating means and can change its position two-dimensionally or three-dimensionally and which performs bending by imparting a bending moment to the portion of the metal material which was heated by the heating means by varying the position of the metal material heated by the heating means two-dimensionally or three-dimensionally while feeding the metal material in the axial direction, and a support guide which suppresses errors in the metal material after the bending by supporting or guiding a portion of the metal material which has exited from the movable roller die.

In this manufacturing apparatus, a cooling means for quenching a portion of the metal material by cooling a portion of the metal material which was locally heated by the heating means is preferably disposed between the heating means and the movable roller die. The speed of movement of the roller die when its position changes is preferably variable.

By using this apparatus, when performing bending of a metal material, heat treatment is performed while the metal material is fed at a constant speed and a portion of the metal material is supported on the downstream side so as to be able to move. As a result, a desired cooling rate can be maintained, and the metal material which underwent bending can be uniformly cooled Therefore, a strength member for an automobile body having a high strength, good shape retention, and a uniform hardness is obtained.

For example, a high cooling rate of at least 100° C. per second can be achieved by intermittently or continuously heating a steel pipe which is a material being worked by a high-frequency heating coil to a temperature which is at least the $A_3$ transformation point and at which the crystal grains constituting the metal structure do not coarsen, subjecting the heated portion to plastic deformation using a movable roller die so as to form a predetermined bent shape, and then immediately spraying with a water- or oil-based cooling medium or other cooling liquid or a gas or a mist at the outer surface or both at the inner surface and the outer surface of the steel pipe which underwent bending.

The movable roller die which imparts a bending moment supports the metal material with maintaining rolling contact with the surface of the metal material, so it can suppress the occurrence of seizing scratches on the surface of the die, and bending can be carried out efficiently. Similarly, the support means also supports the metal material in rolling contact with the metal material, so seizing with the metal material can be suppressed.

In this apparatus, the movable roller die preferably has at least one mechanism selected from a shifting mechanism for vertical shifting, a shifting mechanism for horizontal shifting to the left and the right in a direction perpendicular to the axial direction of the metal material, a tilting mechanism which performs tilting with respect to the vertical direction, and a tilting mechanism which tilts with respect to the horizontal direction to the left and the right perpendicular to the axial direction of the metal material. As a result, bending of the metal material into a wide variety of bent shapes can be achieved, and bending in which the bending direction varying two-dimensionally or three-dimensionally can be efficiently carried out.

The movable roller die preferably has a moving mechanism for movement in the axial direction of the metal material. Due to the provision of this moving mechanism, even when the bending radius of the metal material is small, bending can be carried out while guaranteeing an optimal arm length L. Therefore, the working apparatus can be prevented from becoming large in size and as a result, the accuracy of bending can be increased.

In this apparatus, the heating means and/or the cooling means preferably has at least one mechanism selected from a shifting mechanism for shifting in the vertical direction, a shifting mechanism for shifting to the left and right perpendicular to the axial direction of the metal material, a tilting mechanism for tilting with respect to the vertical direction, and a tilting mechanism for tilting with respect to a horizontal direction perpendicular to the axial direction of the metal material. As a result, the operation of the roller die and that of the heating means and the cooling means can be synchronized, and due to this synchronization, uniform bending of higher accuracy can be carried out.

In this case, the heating means and/or the cooling means preferably has a moving mechanism for moving in the axial direction of the metal material. Due to the heating means and the like having such a moving mechanism, in addition to synchronization with the movable roller die, the front end of a metal pipe can be heated at the start of bending, and operability and maneuverability at the time of mounting and dismounting of a metal pipe can be increased.

In this apparatus, the movable roller die preferably has a rotating mechanism for rotation in the circumferential direction around the axis of the metal material. In addition to a bent shape in which the bending direction of the metal material varies two-dimensionally or three-dimensionally, it is possible to impart a twisted shape.

In this apparatus, the feed device preferably has a mechanism which grips the metal material and rotates it in the circumferential direction around its axis. Even when the rotating mechanism of the movable roller die is not used, it is possible to impart a twisted shape in addition to giving the metal material a bent shape which varies two-dimensionally or three-dimensionally.

In this case, the support means preferably has a rotating mechanism which rotates the metal material in the circumferential direction around its axis in synchrony with rotation of the feed device. At the time of twisting deformation of the metal material, by twisting the rear end of the metal material with the rotating mechanism of the feed device in synchrony with the support apparatus without rotating in the circumferential direction of the movable roller die, a twisted shape of higher accuracy can be imparted. Of course, it is possible to impart a twisted shape of even higher accuracy by relatively twisting the rear end of the metal material by the rotating mechanism of the feed device in synchrony with the support apparatus while rotating the roller die in the circumferential direction around its axis.

In this apparatus, the movable roller die preferably has a rotational drive mechanism for each pair of rolls which rotatably drives the rolls by a drive motor or the like in accordance with the amount of feed by the feed device. If the movable roller die does not have a rotational drive mechanism, rotation of these rolls is driven only by frictional resistance, and there is the possibility of a compressive stress acting on the bent portion of the metal material, of the wall thickness increasing on the inner side of the bent portion, or of buckling taking place. In particular, if the material being worked is a thin-walled material, working may become difficult and the working accuracy may worsen due to this phenomenon.

In contrast, if the movable roller die has a rotational drive mechanism, compressive stresses which act on the bent portion can be reduced, and the rotational speed of the rolls of the movable roller die can be varied in accordance with and in synchrony with the feed amount of the feed device. Therefore, even a tensile stress can be imparted to the bent portion. As a result, the range of possible shapes of bending is expanded, and the working accuracy of a product is increased.

A movable roller die in this apparatus preferably has two, three, or four pairs of rolls, and the metal material preferably is a hollow member having a closed transverse cross section, a hollow member having an open transverse cross section, or a hollow member having a profile transverse cross section. The type of rolls of the movable roller die can be suitably selected in accordance with the cross-sectional shape of the metal material being worked.

In this apparatus, by providing at least one preheating means on the upstream side of the heating means, it is preferable to carry out heating of the metal material a plurality of times or non-uniform heating in which the degree of heating is non-uniform in the circumferential direction around the axis of the metal material. When using the preheating means for multistage heating, the heating load on the metal material can be dispersed, and the bending efficiency can be increased. When a preheating means is used for non-uniform heating of the metal material, in accordance with the bending direction of the metal material by the movable roller die, it is possible to control heating such that the temperature on the inner side of a bent portion in a heated portion of the metal material is lower than the temperature on the outer side of the bent portion. As a result, wrinkles which develop on the inner side of a bent portion and cracks which develop on the outer side of a bent portion can both be prevented.

In this apparatus, a mandrel is preferably inserted inside the metal material as a cooling means while supplying with a cooling medium. Doing so is effective for ensuring the cooling rate particularly when the metal material is a thick-walled material.

In this apparatus, the cooling medium which is supplied from the cooling means preferably is a water-based medium and contains a rust preventing agent and/or a quenching agent. When a sliding portion is wet by cooling water supplied from a cooling device, rust develops when the cooling water does not contain a rust preventing agent. Therefore, the cooling water preferably contains a rust preventing agent. A cooling medium which is supplied from the cooling means may be of a water-based medium containing a quenching agent. An example of a known quenching agent contains an organic polymer. By incorporating a quenching agent in an appropriate concentration in a cooling medium, the cooling rate can be adjusted and stable quenching performance can be obtained.

In this apparatus, a lubricant and/or a cooling fluid is preferably supplied to the movable roller die. If a lubricant is supplied to the movable roller die, even if scale which develops on a heated portion of a metal material becomes caught on the movable roller die, due to the lubricating action, the occurrence of seizing can be decreased. In addition, if a cooling fluid is supplied to the movable roller die, the movable roller die is cooled by the cooling fluid, so a decrease in the strength of the movable roller die, a decrease in the working accuracy due to thermal expansion of the movable roller die, and the occurrence of seizing on the surface of the movable roller die can all be prevented.

In this apparatus, operation of the movable roller die, the heating means, or the cooling means by at least one of a shifting mechanism, a tilting mechanism, and a moving mechanism is preferably carried out by an articulated robot which supports the movable roller die, the heating means, or the cooling means and which has at least one joint which can rotate about at least one axis.

By using an articulated robot, when performing bending of a steel pipe, shifting in the vertical direction or to the left and right, tilting operation by sloping in the vertical direction or to the left and right, or frontwards and backwards movement which are necessary for the movable roller die, the heating means, and the cooling means and which are carried out by a manipulator can easily be carried out by a series of operations in response to control signals. Therefore, an increase in bending efficiency and a decrease in the size of the working apparatus can be achieved.

From another standpoint, a strength member for an automobile body, a front side member, and a side reinforcing member in a side structure of an automobile body according to the present invention is manufactured by a manufacturing line for a bent product having a seam welded pipe manufacturing line which comprises an uncoiler which continuously pays off a steel strip, a forming means which forms the uncoiled steel strip into a pipe having a desired cross-sectional shape, a welding means which welds both abutted edges of the steel strip and forms a continuous pipe, a post-treatment means which cuts off a weld bead and if necessary performs post-annealing and sizing, and a manufacturing apparatus for a bent product according to the present invention as described above disposed on the exit side of the post-treatment means.

A strength member for an automobile body, a front side member, and a side reinforcing member in a side structure in an automobile body according to the present invention is also manufactured by a manufacturing line for a bent product having a roll-forming line which comprises an uncoiler which continuously pays off a steel strip and a forming means which forms the uncoiled steel strip into a prescribed cross-sectional shape, and a manufacturing apparatus for a bent product according to the present invention as described above disposed on the exit side of the forming means.

A strength member for an automobile body, a front side member, and a side reinforcing member of a side structure for an automobile body according to the present invention can use a steel pipe having a round transverse cross section However, the present invention is not limited to a steel pipe, and it can be similarly applied to any elongated tubular member having any type of transverse cross section. For example, in addition to a steel pipe, it can be applied to any member having a closed cross section which is rectangular, trapezoidal, or a complicated shape.

Effects of the Invention

According to the present invention, a strength member for an automobile body, such as a side member, a suspension member, a crash box, various types of pillars, a cross member, a roof rail side member, a side sill, and the like having a bent portion and an ultrahigh strength heat-treated portion which has been heat-treated so as to have a tensile strength exceeding 1100 MPa and which did not exist in the past and which has good shape retention, a predetermined hardness distribution, and a desired dimensional accuracy can be efficiently and economically provided without developing surface scratches.

According to the present invention, a front side member simultaneously having a high strength, a low weight, and impact absorbing ability which could not be obtained in the past and which has excellent weldability and formability which make it possible for it to be mass produced on an industrial scale can be provided.

In addition, according to the present invention, a side structure for an automobile body can be provided which enables a higher strength, a decrease in weight, and a decrease in the manufacturing costs of an automobile body to be simultaneously achieved.

BRIEF EXPLANATION OF THE DRAWINGS

FIG. 9(a) shows a case in which a metal material is a hollow member with a closed cross section, FIG. 9(b) shows a case in which a metal material is a member with a closed cross section such as a rectangular pipe or a member with an open cross section such as a channel, and FIG. 9(c) shows a case in which a metal matter is a member with a closed cross section such as a rectangular pipe or a member with a profile cross section such as a channel.

Figure 1:
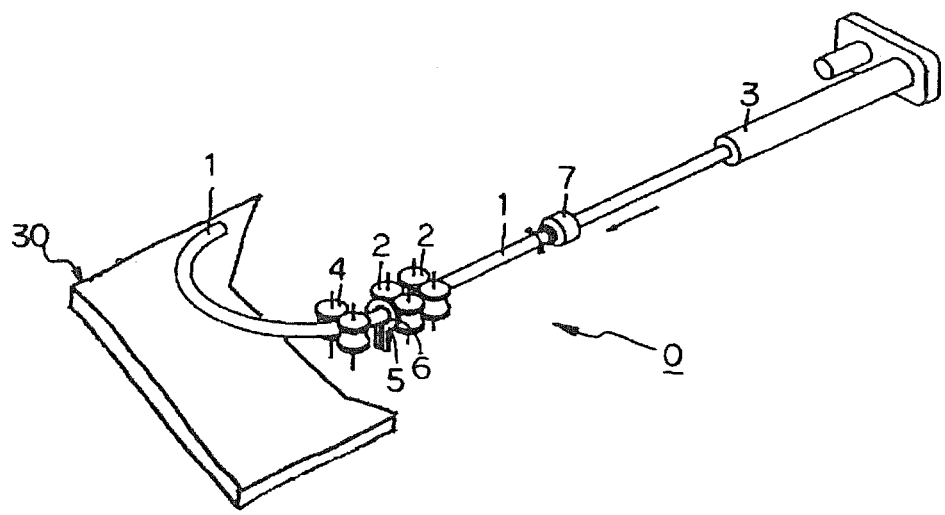
FIG. 1 is an explanatory view showing a simplification of the overall structure of a manufacturing apparatus for a bent product for carrying out bending according to an embodiment.

EXPLANATION OF SYMBOLS 1 metal material
2 support means
3 feed device
4 movable roller die, pinch roll
5 heating means, heating device, high frequency heating coil
5a preheating means, preheating device, high frequency heating coil for preheating
6 cooling means, cooling device
6a mandrel
7 chuck mechanism
8, 9, 10 drive motors
10a drive gear
11 articulated robot
12 fixed surface
13, 14, 15 anus 16, 17, 18 joints
19 seam welded steel pipe manufacturing line
20 steel strip
21 uncoiler
22, 27 forming means
23 welding means
24 post-treatment means
25, 28 cutting means
26 roll forming line
30 support guide
40 unitary suspension member/side member
40a bent portion
40b portion to be cut or punched
40c portion to be welded
40d tubular body
40e ultrahigh strength heat-treated portion
40f high strength heat-treated portion
41A-41D front side member
41Aa bent portion
41Ab portion to be cut or punched
41Ac portion to be welded
41Ad tubular body
41Ae ultrahigh strength heat-treated portion
41Af high strength heat-treated portion
41B front side member
41Ba bent portion
41Bb portion to be cut or punched
41Bc portion to be welded
41Bd tubular body
41Be ultrahigh strength heat-treated portion
41Bf high strength heat-treated portion
41C front side member
41Ca bent portion
41Cb portion to be cut or punched
41Cc portion to be welded
41Cd tubular body
41Ce ultrahigh strength heat-treated portion
41Cf high strength heat-treated portion
41D front side member
41Da bent portion
41Db portion to be cut or punched
41Dc portion to be welded
41Dd tubular body
41De ultrahigh strength heat-treated portion
41Df high strength heat-treated portion
42A, 42B B-pillar
42Aa, 42Ba bent portion
42Ab, 42Bb portion to be cut or punched
42Ac, 42Bc portion to be welded
42Ad, 42Bd tubular body
42Ae, 42Be ultrahigh strength heat-treated portion
42Af, 42Bf high strength heat-treated portion
43A, 43B cross member
43Aa, 43Ba bent portion
43Ab, 43Bb portion to be cut or punched
43Ac, 43Bc portion to be welded
43Ad, 43Bd tubular body
43Ae, 43Be ultrahigh strength heat-treated portion
43Af, 43Bf high strength heat-treated portion
44A, 44B unitary A-pillar/roof rail side member
44Aa, 44Ba bent portion
44Ab, 44Bb portion to be cut or punched
44Ac, 44Bc portion to be welded
44Ad, 44Bd tubular body
44Ae, 44Be ultrahigh strength heat-treated portion
44Af, 44Bf high strength heat-treated portion
50 floor panel
51 automobile (vehicle) body
52 engine compartment
52a side (vertical) wall portion
53 front side member
53-1 through 53-14 first through fourteenth examples
54 body
54a one end portion
54b other end portion
55 front (end) portion
55a unquenched portion
55b high frequency quenched portion
56 sloping portion
57 rear (end) portion
57a unquenched portion
57b high frequency quenched portion 58 cabin
59 dash panel
61 automobile body
62 side structure
63 A-pillar
63a first portion
63b second portion
64 B-pillar
65 roof rail side member
66 side sill
67 C-pillar
68 floor panel
69 wheel housing outer (member)
70, 70-1, 70-2 side reinforcing member
71 engine compartment

BEST MODE FOR CARRYING OUT THE INVENTION

First Embodiment

Below, best modes for carrying out a strength member for an automobile body according to the present invention, a manufacturing method and a manufacturing apparatus therefor, and a manufacturing line therefor will be explained in detail while referring to the attached drawings.

First, (I) the overall structure and a support means, (II) the structure of a working portion and a heating device and cooling device, (III) a movable roller die, (IV) a preheating means and its effect, (V) a support guide, (VI) the structure and arrangement of an articulated robot, and (VII) a bending line of this embodiment will be sequentially explained below while referring to the attached drawings.

(I) Overall Structure and Support Means

FIG. 1 is an explanatory view showing in simplified form the overall structure of a manufacturing apparatus 0 for a bent product for carrying out bending according to this embodiment.

In this embodiment, a metal material 1, which is a material being worked, is supported by support means 2, 2 so as to be able to move in its axial direction and undergoes bending on the downstream side of the support means 2, 2 while being intermittently or continuously fed from the upstream side by a feed device 3.

The metal material 1 shown in FIG. 1 is a steel pipe having a round transverse cross-sectional shape. However, the present invention is not limited to a steel pipe, and the present invention can be similarly applied to any elongated material being worked having a closed cross section. In addition to the steel pipe shown in FIG. 1, the metal material 1 may have a closed cross section with a rectangular, trapezoidal, or complicated shape.

Figure 2:
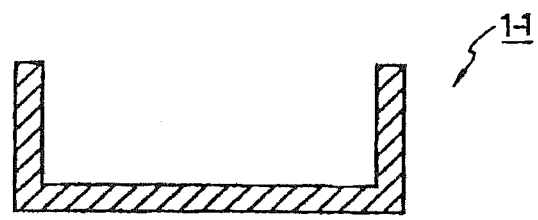
FIG. 2 is an explanatory view showing the transverse cross-sectional shape of a member to be worked which can be used as a metal material in an embodiment, FIG. 2(a) showing a channel having an open cross section which is manufactured by roll forming or the like, and FIG. 2b) showing a channel having a profile cross section which is manufactured by feed processing.
Figure 2:
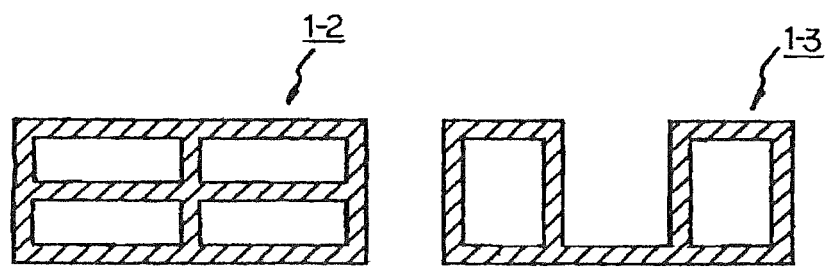

FIG. 2 is an explanatory view showing transverse cross sections of materials being worked 1-1 through 1-3 which can be used as a metal material 1 in this embodiment. FIG. 2(a) shows a channel 1-1 having an open cross section which is manufactured by roll forming or the like, and FIG. 2(b) shows channels 1-2 and 1-3 having profile cross sections which are manufactured by feed processing. In the manufacturing apparatus 0 of this embodiment, the shape of the portions of a below-described movable roller die 4 and support means 2 which contact the metal material 1 can be suitably selected in accordance with the transverse cross-sectional shape of the metal material 1 which is employed.

In the manufacturing apparatus 0 shown in FIG. 1, in order to support the metal material 1 in a suitable position while feeding it in its axial direction, two pairs of support means 2, 2 which are spaced in the axial direction of the metal material 1 and a feed device 3 which is disposed on the upstream side of the support means 2, 2 and which intermittently or continuously feeds the metal material 1 are provided. The manufacturing apparatus 0 has a movable roller die 4 which is disposed on the downstream side of the two support means 2, 2 and which feeds the metal material 1 in its axial direction. The position of the movable roller die 4 can be moved two-dimensionally or three-dimensionally.

On the entrance side of the movable roller die 4, a high frequency heating coil 5, which is a heating means for rapidly heating a portion of the metal material 1 in the lengthwise direction, is disposed on the outer periphery of the metal material 1. In addition, a water cooling device 6, which is a cooling means for rapidly cooling a portion adjoining the downstream side of the heated portion of the metal material 1 which was locally rapidly heated by the high frequency heating coil 5 is provided. To the heated portion, a bending moment is imparted by two-dimensional or three-dimensional movement of the movable roller die 4.

In addition, a support guide 30 is provided on the exit side of the movable roller die 4, for suppressing dimensional errors caused by deformation of the metal material 1 after bending by supporting a portion of the metal material 1 which has exited from the movable roller die 4.

In the embodiment shown in FIG. 1, as a steel pipe having a round transverse cross section is used as a metal pipe 1, two pairs of grooved rolls which are disposed facing each other and spaced from each other such that their rotational axis are parallel are used as the support means 2. However, the support means 2 is not limited to a pair of grooved rolls, and a support means suitable for the cross-sectional shape of the metal material 1 can be used. In addition, even when a support means is constituted by a pair of grooved rolls, the support means is not limited to one constituted by two sets of support roll pairs 2, 2 as shown in FIG. 1, and one or three sets of support roll pairs 2 may be employed.

Figure 3:
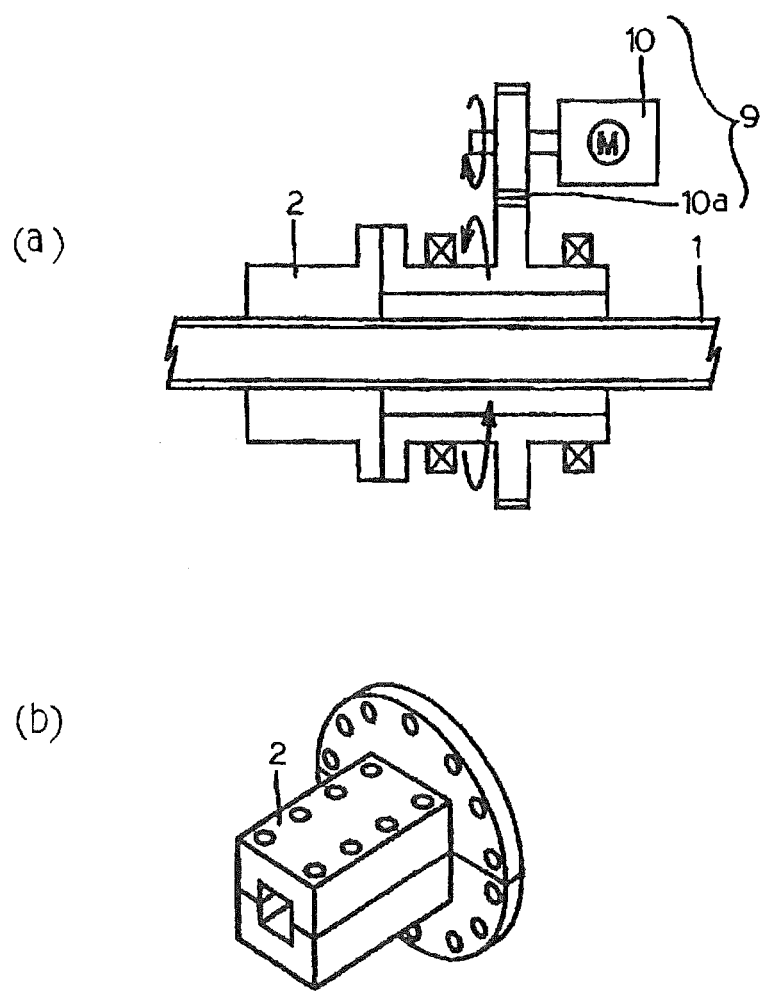
FIG. 3 is an explanatory view showing one example of the structure of a support guide which can be used as a support means in an embodiment, FIG. 3(a) being a cross-sectional view showing the arrangement of the support guide and a rotating mechanism which drives the support guide, and FIG. 3(b) being a perspective view showing the external appearance of the support guide.

FIG. 3 is an explanatory view showing one example of the structure of a support guide which can be used as a support means 2 in this embodiment. FIG. 3(a) is a cross-sectional view showing the arrangement of a support guide 2 and a rotating mechanism 9 for driving the support guide 2, and FIG. 3(b) is a perspective view showing the exterior of the support guide 2.

In the example shown in FIG. 3, the metal material 1 is a rectangular pipe having a square or rectangular transverse cross section. The support guide 2 holds the rectangular pipe 1 so that it can rotate. The support guide 2 is disposed in the vicinity of the high frequency heating coil 5. In order to prevent the support guide 2 from being heated, it is made of a nonmagnetic material, and as shown in FIG. 3(b), it is divided into two or more portions. An unillustrated electrically insulating material such as Teflon (trademark) is preferably provided at the locations where the support guide 2 is divided.

A rotating mechanism 9 comprising a drive motor 10 and a rotational gear 10a is directly connected to the support guide 2. As described below, the rotating mechanism 9 can rotate the support guide 2 in the circumferential direction around the axis of the metal material 1 in synchrony with the rotation of the feed device 3. As a result, highly accurate twisting deformation can be imparted to the metal material 1 when twisting deformation of the metal material 1 is desired.

The manufacturing apparatus 0 can use either the support rolls shown in FIG. 1 or the support guide shown in FIG. 3 as a support means 2 for the metal material 1. In the following explanation, an example will be given of the case in which the steel pipe 1 shown in FIG. 1 is used as a metal material and a pair of support rolls 2 is used. However, in the present invention, the metal material need not be a round pipe and may be a member having a closed cross section other than a round pipe. In addition, the present invention can be similarly applied when using support guides in place of support rolls.

(II) Structures of a Working Portion, a Heating Device, and a Cooling Device

Figure 4:
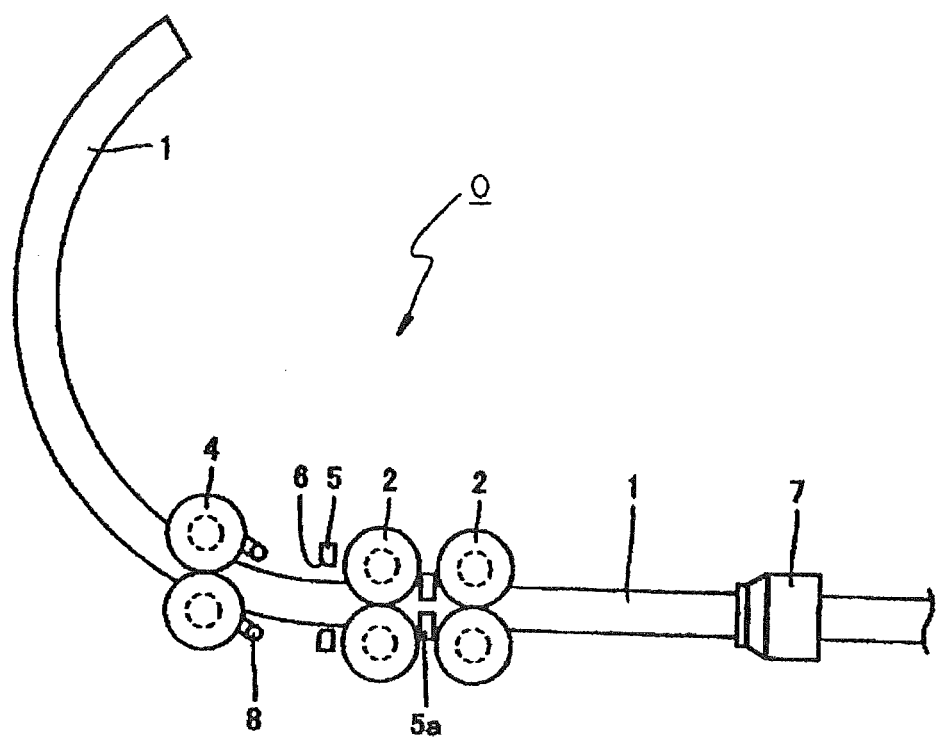
FIG. 4 is an explanatory view showing the structure of a working portion of a manufacturing apparatus of an embodiment.

FIG. 4 is an explanatory view showing the structure of the working portion of a manufacturing apparatus 0 of this embodiment.

As shown in this figure, a movable roller die 4 is disposed on the downstream side of two pairs of support rolls 2, 2 for holding a metal material 1. A high frequency heating coil 5 and a cooling device 6 are disposed on the entrance side of the movable roller die 4. A preheating device 5*a* is disposed between the two support roll pairs 2, 2, and a lubricant supply means 8 is installed in the immediate vicinity of the entrance side of the movable roller die 4.

In FIG. 4, the metal material 1 which has passed through the two support roll pairs 2, 2 is supported by the movable roller die 4 while being fed in its lengthwise direction, and the metal material 1 is locally rapidly heated to a temperature at which quenching is possible using the high frequency heating coil 5 disposed on the outer periphery of the metal material 1 while controlling the position of the movable roller die 4 and if necessary its speed of movement two-dimensionally or three-dimensionally in order to bend the metal material 1 into a desired shape. The bent portion is rapidly cooled locally using the cooling device 6.

At the time of bending, the yield point of the portion of the metal material 1 which is bent by the movable roller die 4 is decreased and hence the resistance to deformation is decreased by heating the metal material 1 which has passed through the two support roll pairs 2, 2 with the high frequency coil 5 to a temperature range in which quenching is possible, so the metal material 1 can be easily bent to a desired shape.

The movable roller die 4 supports the metal material 1 while it is being fed in the axial direction by the grooved roll pairs 2, 2, so the occurrence of seizing scratches in the surface of the movable roller die 4 can be suppressed. In addition, since a lubricant is supplied to the movable roller die 4, even if scale which develops on heated portions of the metal material 1 becomes caught on the movable roller die 4, the occurrence of seizing scratches can be decreased by the lubricating action of the surface of the movable roller die 4.

In this manufacturing apparatus 0, cooling fluid can be supplied to the movable roller die 4, so the movable roller die 4 is cooled by the cooling fluid. As a result, a decrease in the strength of the movable roller die 4, a decrease in the working accuracy due to thermal expansion of the movable roller die 4, and the occurrence of seizing scratches on the surface of the movable roller die 4 can all be prevented.

Figure 5:
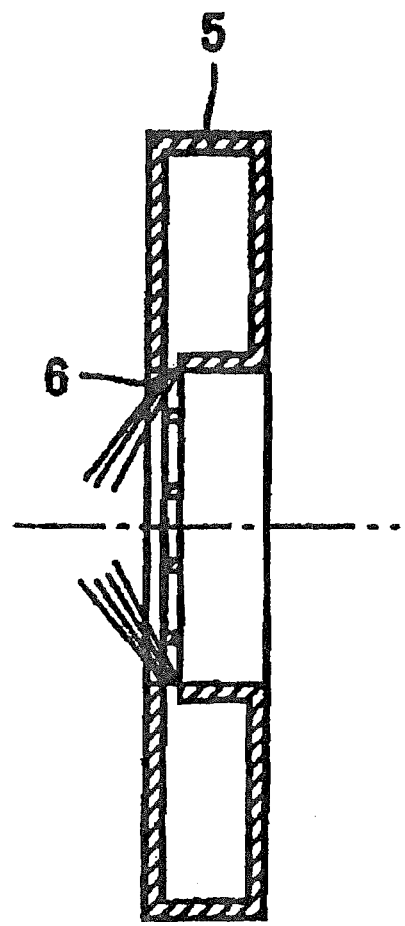
FIG. 5 is an explanatory view schematically showing an example of the structure of a heating device and a cooling device in a manufacturing apparatus of an embodiment.

FIG. 5 is an explanatory view schematically showing an example of the structure of the heating device 5 and the cooling device 6 in this embodiment.

The heating device 5 is constituted by a high frequency heating coil 5 which is disposed in an annular shape on the outer periphery of a portion of a metal material 1 which is to be heated, and it locally heats the metal material 1 to a temperature range in which quenching is possible. By then moving the roller die 4 two-dimensionally or three-dimensionally, a bending moment is applied to the portion of the metal material 1 which was heated by the heating device 5.

By spraying a cooling medium from the cooling device 6 at the heated portion of the metal material 1, the heated portion of the metal material 1 is quenched.

As described above, the metal material 1 prior to high frequency heating is supported by two support roll pairs 2, 2. In this embodiment, the heating device 5 and the cooling device 6 are integral with each other, but they may be separately formed.

In this manner, a metal material 1 can be intermittently or continuously heated to a temperature which is at least the $A_3$ transformation point and at which the structure does not coarsen, plastic deformation can be imparted by the movable roller die 4 to the a portion of the metal material was locally heated, and immediately thereafter, a cooling medium is sprayed at the heated portion, whereby quenching can be performed at a cooling rate of at least 100° C. per second.

Accordingly, the metal material 1 which is subjected to bending can achieve excellent shape retention and stable quality. For example, even when bending is carried out using a low strength metal material as a starting material, the strength of the material can be increased by carrying out uniform quenching in the axial direction, and a bent product having a tensile strength corresponding to at least 900 MPa or even 1300 MPa class or above can be manufactured.

As the wall thickness of the metal material 1 increases, it sometimes becomes difficult to maintain a cooling rate of at least 100° C. per second. In such cases, when the metal material 1 is a hollow member with a closed cross section (a metal pipe) such as a round pipe, a rectangular pipe, or a trapezoidal pipe, a mandrel bar is preferably inserted into the member with a closed cross section as a cooling means for guaranteeing a desired cooling rate.

Figure 6:
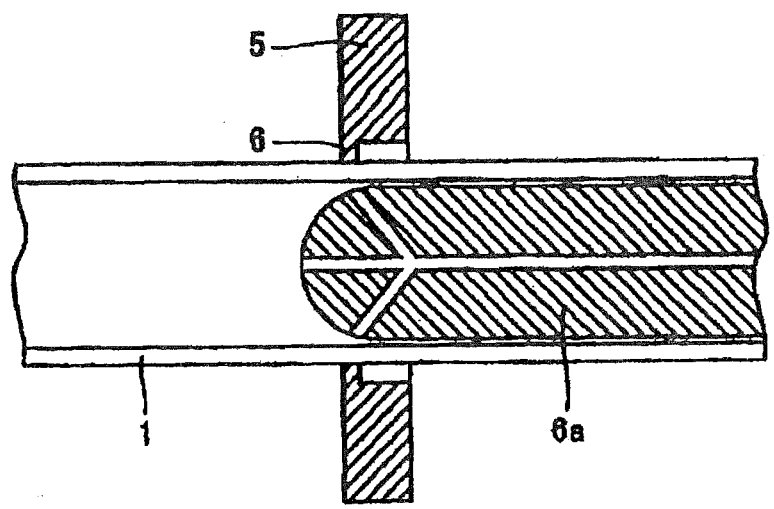
FIG. 6 is an explanatory view showing the state in which a mandrel is inserted inside a hollow member with a closed cross section in order to guarantee the cooling rate of a thick-walled member.

FIG. 6 is an explanatory view showing the state in which a mandrel bar is inserted into a hollow member with a closed cross section in order to guarantee the cooling rate of a thick-walled material.

When a hollow member with a closed cross section has a large wall thickness, a mandrel bar 6*a* can be inserted into its interior as a cooling means, and a cooling medium can be supplied in synchrony with the cooling means 6 disposed on the outer periphery of the metal material 1 to guarantee the desired cooling rate. The interior of the metal material 1 can be cooled with a fluid or a mist. The mandrel bar 6*a* is preferably made of a non-magnetic material or a refractory material.

The manufacturing apparatus 0 of this embodiment preferably uses a a water-based cooling medium containing a rust-preventing agent as the cooling medium which is supplied by the cooling means 6. If sliding parts of the working apparatus are wet by cooling water which does not contain a rust-preventing agent, rust develops. Therefore, it is effective to include a rust-preventing agent in the cooling water.

In addition, a cooling medium supplied from the cooling means 6 is preferably a water-based one containing a quenching agent. For example, a quenching agent containing an organic polymer is known. By adding a quenching agent in an appropriate prescribed concentration, the cooling rate can be adjusted and stable hardenability can be guaranteed.

(III) Structure of the Movable Roller Die 4

Figure 7:
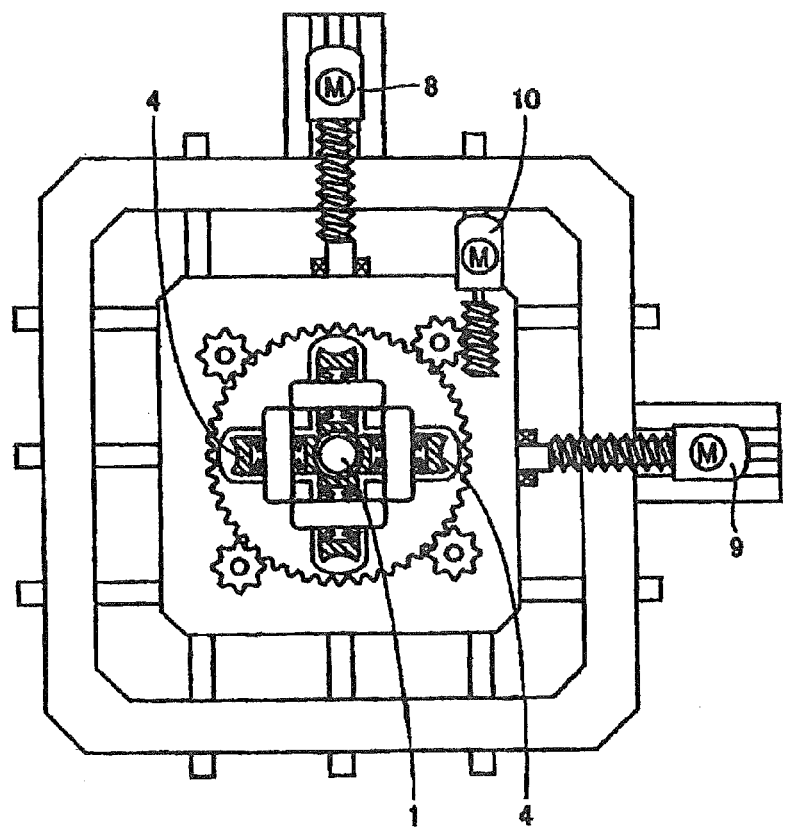
FIG. 7 is an explanatory view showing a shifting mechanism for moving a movable roller die of a manufacturing apparatus of an embodiment upwards and downwards and to the left and the right and a rotating mechanism for rotating in the circumferential direction.

FIG. 7 is an explanatory view showing shifting mechanisms for moving the movable roller die 4 in the manufacturing apparatus 0 of this embodiment up and down and to the left and right and a rotating mechanism for rotation in the circumferential direction around the axis of a metal pipe.

The movable roller die 4 shown in FIG. 7 is different from the movable roller die 4 shown in FIG. 1 and has four rolls which support a metal material 1 (a round pipe) which is a material being worked so that the material can move in its axial direction. A shifting mechanism for shifting upwards and downwards is constituted by a drive motor 8, and a shifting mechanism for movement to the left and right is constituted by a drive motor 9. A rotating mechanism for rotation in the circumferential direction is constituted by a drive motor 10.

In FIG. 7, the structure of a tilting mechanism which tilts the movable roller die 4 up and down or to the left and right is not shown. However, there is no particular limitation on this tilting mechanism, and a well-known, conventional mechanism can be employed.

Figure 8:
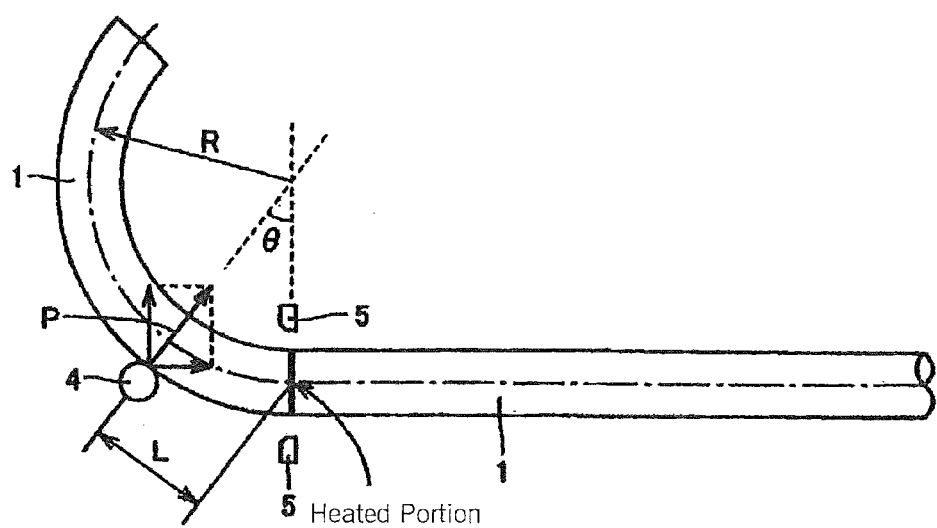
FIG. 8 is an explanatory view of a moving mechanism for moving a movable roller die in a manufacturing apparatus of an embodiment forwards and backwards.

FIG. 8 is an explanatory view of a moving mechanism for movement in the forwards and backwards direction of the movable roller die 4. As shown in FIG. 8, the bending moment M necessary for bending is determined by the following equation (A) in which L is the arm length (the work length of the metal material 1).

$$M = P \times L = P \times R \sin \theta \quad (A)$$

Accordingly, the longer is the arm length L, the smaller is the force P acting on the pinch rolls (the movable roller die) 4. Namely, when it is desired to perform working which ranges from a small radius of curvature to a large radius of curvature, if the movable roller die 4 is not moved forwards and backwards, the force P when working is performed on a metal material 1 having a small radius of curvature sometimes exceeds the capacity of the equipment. Therefore, if the arm length L is set to a large value when working a metal material 1 having a small radius of curvature, when working is performed on a metal material having a large radius of curvature, a large stroke is necessary for the shifting mechanism and the tilting mechanism of the movable roller die 4, and the apparatus becomes large.

On the other hand, taking into consideration the stopping accuracy and the allowable error of the manufacturing apparatus 0, the working accuracy worsens when the arm length L is small. Therefore, by arranging the movable roller die 4 so that it can move forwards and backwards in accordance with the bending radius of the metal material 1, an optimal aim length L is obtained regardless of the radius of curvature of the metal material 1, and the range in which working is possible can be increased. Moreover, a sufficient working accuracy can be guaranteed without increasing the size of the working apparatus.

Similarly, in the manufacturing apparatus 0 of this embodiment, a moving mechanism for back and forth movement may be provided individually or in common for the high-frequency heating device and the cooling device. As a result, synchronization of these devices with the movable roller die 4 can be maintained, the end of a metal material 1 can be heated at the start of bending, and the ease of mounting and dismounting of the metal material 1 and operability can both be improved.

Figure 9:
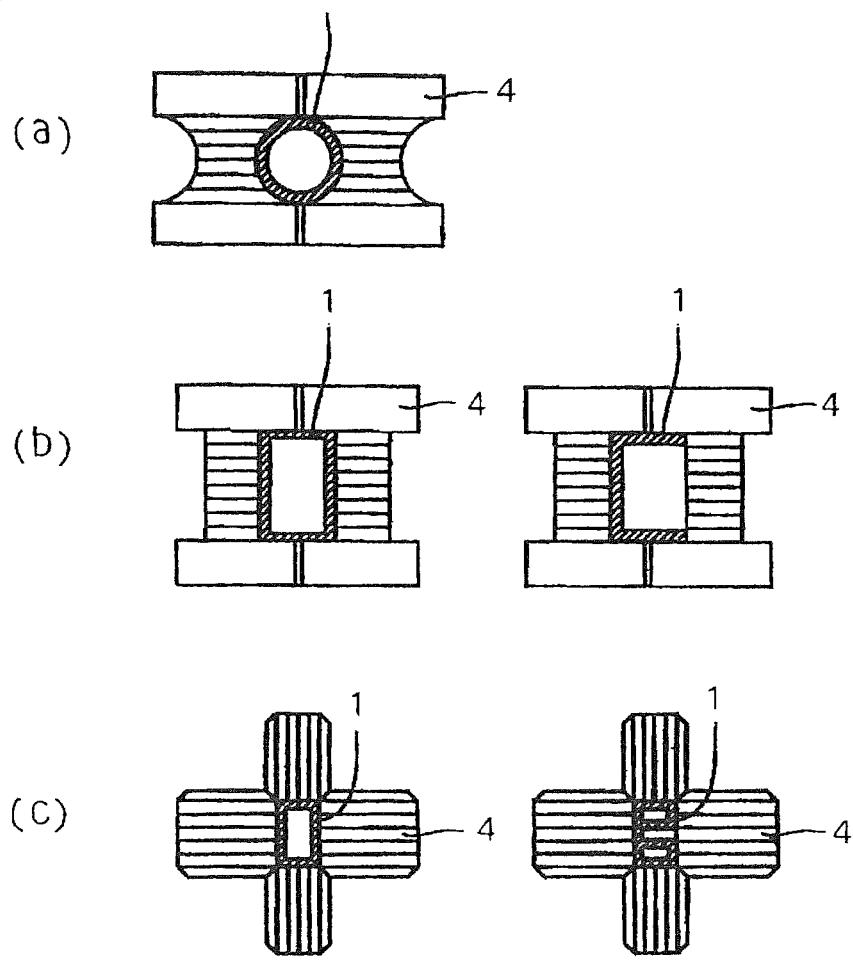
FIG. 9 is a view showing rolls constituting a movable roller die of a manufacturing apparatus of an embodiment.

FIG. 9 is an explanatory view showing various rolls of a movable roller die 4 of the manufacturing apparatus 0 in this embodiment. FIG. 9(a) shows a case in which a metal material 1 is a member with a closed cross section such as a round pipe, FIG. 9(b) shows a case in which a metal material 1 is a member with a closed cross section such as a rectangular pipe or a member with an open cross section such as a channel, and FIG. 9(c) shows a case in which a metal material 1 is a member with a closed cross section such as a rectangular pipe or a member with a profile cross section such as a channel.

The shape of rolls in the movable roller die 4 can be designed in accordance with the cross-sectional shape of the metal material 1. While the movable roller die 4 may be constituted by two or four rolls as shown by FIGS. 9(a)-9(c), it may also be constituted by three rolls.

The cross sectional shape of a metal material which undergoes bending can be a closed cross-sectional shape such as a round, rectangular, or trapezoidal shape, or complex shape which is formed by roll foaming, or an open cross-sectional shape or it may be a profile cross-sectional shape obtained by feed processing. When the cross-sectional shape of the metal material 1 is substantially rectangular, as shown in FIG. 9(c), the movable roller die 4 preferably has four rolls.

In the manufacturing apparatus 0 of this embodiment, in order to additionally impart twisting deformation to the metal material 1, as shown in FIG. 7, the movable roller die 4 is preferably provided with a rotating mechanism for rotation in the circumferential direction around the axis of the metal material 1. In addition, although not shown in FIG. 1, the feed device 3 is preferably provided with a chuck mechanism 7 which can grip the metal material 1 and rotate it in the circumferential direction about its axis.

Accordingly, when additionally imparting twisting deformation to the metal material 1 with the manufacturing apparatus 0, it is possible to use a method in which twisting deformation is imparted to the front end of the metal material 1 using a rotating mechanism of the movable roller die 4 or a method in which twisting deformation is imparted to the rear end of the metal material 1 using a rotating mechanism of the feed device 3. Normally, a method using a rotating mechanism of the feed device 3 results in a compact apparatus, while a method using a rotating mechanism of the movable roller die 4 may cause the apparatus to become large. However, either method can impart twisting deformation to a metal material 1.

In the manufacturing apparatus 0, by further providing the support means 2 (support rollers or support guide) with a rotating mechanism which rotates in the circumferential direction about the axis of the metal material 1, it is possible to rotate the metal material 1 in the circumferential direction about its axis in synchrony with the rotation of the feed device 3. When imparting twisting deformation to the metal material 1, it is possible to impart twisting deformation to the metal material 1 with good accuracy as a result of synchrony with the support means 2 whether using a method in which twisting deformation is imparted to the front end of the metal material 1 using a rotating mechanism of the movable roller die 4 or a method in which twisting deformation is imparted to the rear end of the metal material 1 using a rotating mechanism of the feed device 3.

In the manufacturing apparatus 0, by providing each roll pair constituting the movable roller die 4 with a rotational drive mechanism, a rotational drive force can be imparted to the roll pair by drive motors or the like in accordance with the amount of feed by the feed device 3. As a result, the compressive stresses acting on the portion undergoing bending can be relaxed, and if the rotational speed of the rolls of the movable roller die 4 is controlled so as to be synchronous with the feed by the feed device 3 in accordance with the amount of feed by the feed device, it is possible to impart a tensile stress to the portion of the metal material 1 undergoing bending. Thus, the range of bending can be increased, and the working accuracy of a product can be increased.

(IV) Preheating Means and its Effect

In a manufacturing apparatus 0 of this embodiment, two or more stages of heating or non-uniform heating of the metal material 1 can be carried out by the preheating device 5a provided on the upstream side of the heating device 5.

When the preheating means 5a is used for multistage heating, the heating load on the metal material 1 can be dispersed, and the efficiency of bending can be increased.

Figure 10:
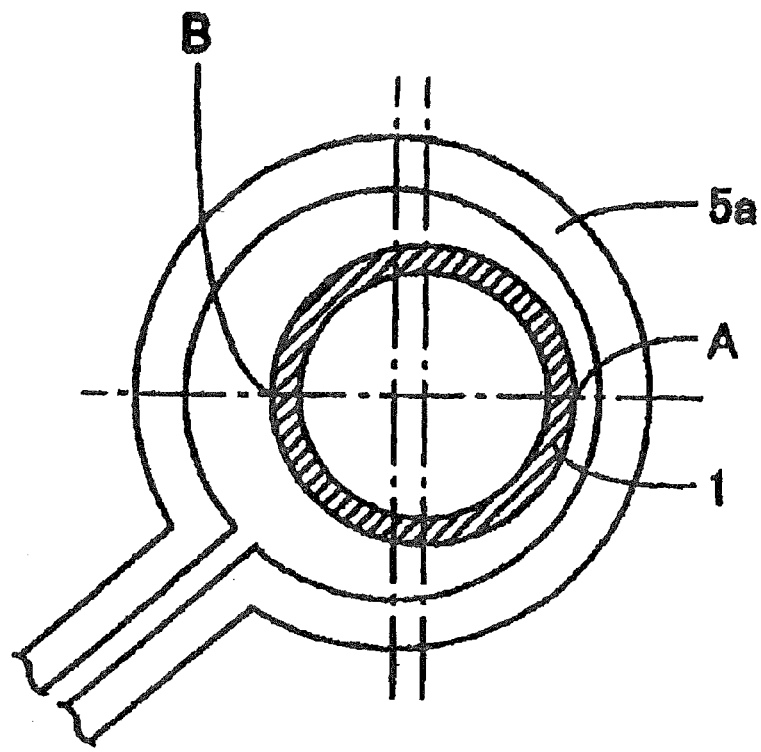
FIG. 10 is a view for explaining the effect when a preheating device is used for non-uniform heating of a metal material.

FIG. 10 is an explanatory view for explaining the effect when the preheating device 5a is used for non-uniform heating of the metal material 1.

When a high-frequency heating coil 5a for preheating is used as a preheating device for carrying out non-uniform heating of the metal material 1, by disposing the metal material 1 towards one side of the interior of the high-frequency coil 5a for preheating, based on the bending direction of the metal material 1 by the movable roller die 4, the temperature of the heated portion of the metal material 1 on the inner side of a bend is made lower than the temperature on the outer side of a bend.

Specifically, in FIG. 10, by positioning side A of the metal material 1 so as to be close to the high-frequency heating coil 5a for preheating, the temperature of the outer surface on side A corresponding to the outer side of a bend is made higher than the temperature of the outer surface on side B corresponding to the inner side of a bend. As a result, wrinkles which develop on the inner side of a bend and cracks which develop on the outer side of a bend can both be effectively prevented.

A lubricant can be supplied to the movable roller die 4 in the manufacturing apparatus 0. As a result, when scale which develops on the heated portion of the metal material 1 becomes caught on the movable roller die 4, the occurrence of seizing on the surface can be decreased by the lubricating action provided by the supplied lubricant.

Similarly, a cooling fluid can be supplied to the movable roller die 4 in the manufacturing apparatus 0. By providing cooling piping in the interior of the movable roller die 4 in the vicinity of the location which holds a metal material 1 and supplying a cooling fluid to the movable roller die 4, the movable roller die 4 is cooled by the cooling fluid. Thus, a decrease in the strength of the movable roller die 4, a decrease in working accuracy due to thermal expansion of the movable roller die 4, and the occurrence of seizing on the surface of the movable roller die 4 can be prevented.

(V) Support Guide 30

Figure 11:
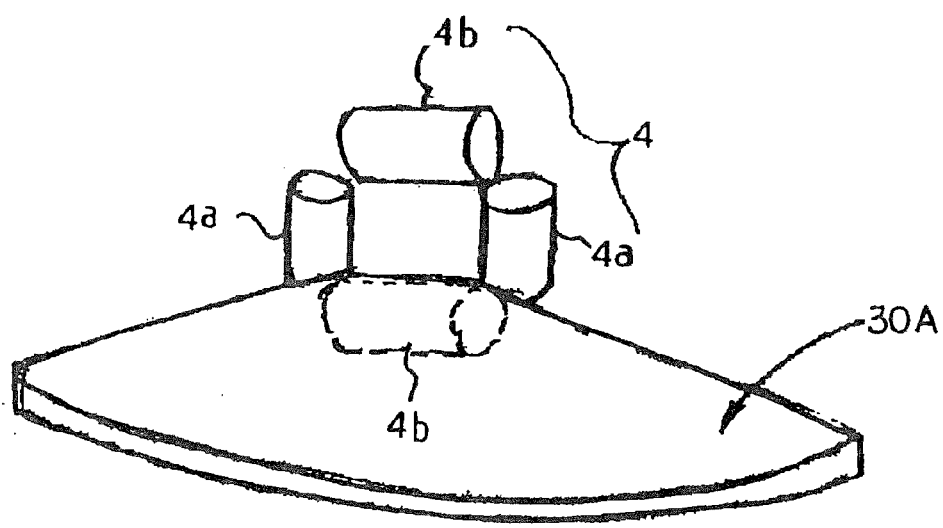
FIG. 11 is an explanatory view showing one example of a support guide.

FIG. 11 is an explanatory view showing one example 30A of a support guide 30. The support guide 30 can be provided for the purpose of suppressing dimensional errors due to post-bending deformation of a metal material 1 by supporting the metal material 1 which has passed through the movable roller die 4.

The support guide 30A shown in FIG. 11 is being used when carrying out bending on a metal material having a rectangular transverse cross section instead of the metal material 1 shown in FIG. 1 having a round transverse cross section. In the illustrated case, the movable roller die 4 is constituted by a total of 4 rolls including a roll pair 4a, 4a disposed on the left and the right and a pair 4b, 4b disposed above and below. In this case, a portion of a metal material 1 undergoing bending has a two-dimensionally bent shape which changes in shape only in a horizontal plane.

At the time of bending, the movable roller die 4 moves to a prescribed spatial position with performing positioning of the end of the metal material 1 in the vertical direction by the roll pair 4b, 4b and to the left and right by the roll pair 4a, 4a. Namely, movement of the roller die in the horizontal direction (referred to below as horizontal shifting) and rotation thereof in a plane (referred to below as left and right tilting) are carried out. When the metal material 1 has only a two-dimensionally bent shape, it is possible to carry out only horizontal shifting.

As shown in FIG. 11, the support guide 30A is installed on the exit side of the movable roller die 4. The support guide 30A may be disposed in an unillustrated housing of the movable roller die 4 or in another member unconnected to the housing.

By supporting the lower surface of the metal material 1 which underwent bending on the exit side of the movable roller die 4, the support guide 30A prevents the metal materia from undergoing additional deformation caused by a moment in the vertical direction due to gravity acting on the portion of the metal material 1 which underwent bending. Therefore, by providing the support guide 30A, a bent product can be stably manufactured to a desired shape with high accuracy.

Figure 12:
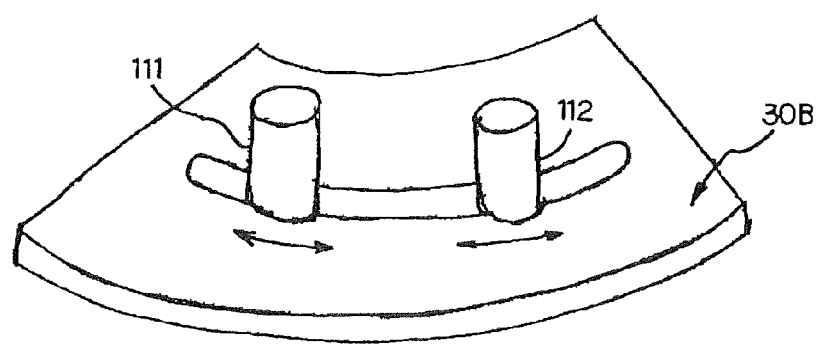
FIG. 12 is an explanatory view showing another example of a support guide.

FIG. 12 is an explanatory view showing another example 30B of a support guide 30 according to this embodiment.

This example is also for use when carrying out bending on a metal material having a rectangular transverse cross section, and an unillustrated movable roller die is a four-roll type like the movable roller die 4 shown in FIG. 4. The metal material 1 has a two-dimensionally bent shape with bending deformation only in a horizontal plane. At the time of bending, the movable roller die 4 moves while holding and positioning the end of the metal material 1 in the vertical direction and to the the left and right so that the roller die moves to a prescribed spatial position, namely, by horizontal shifting and left and right tilting.

In this example, in the same manner as in the example shown in FIG. 11, a support guide 30B is disposed on the exit side of the movable roller die 4, but in addition rolls 111 and 112 which guide the metal material 1 in the horizontal direction are disposed in a groove provided in the top surface of the support guide 30B such that these rolls can move along a circular path and. The rolls 111 and 112 move in accordance with the movement of the metal material 1 at the time of working, i.e., they carry out horizontal shifting and left and right tilting. These movements are transmitted to an unillustrated control means so as to synchronize with the feed device 3 and the movable roller die 4.

With the support guide 30B shown in FIG. 12, left and right tilting is carried out with a prescribed radius. However, with a two-dimensionally bent shape, it is possible to carry out only horizontal shifting. In addition, a pressure applying means such as a hydraulic cylinder may be provided on one of rolls 111 and 112.

The support guide 30B can be installed in a housing of the movable roller die 4 or in another member which is separate from the housing. If the movable roller die 4 is secured in a housing, the range of movement in horizontal shifting or left and right tilting is decreased, which is advantageous from the standpoint of installation. In either case, since the lower surface and the left and right surfaces of a metal material 1 during bending are guided on the exit side of the movable roller die 4 by the support guide 30B, additional deformation occurring in a portion of the metal material 1 which has passed through the movable roller die 4 can be prevented even if the worked portion undergoes the action of gravity of the metal material or of an additional moment in the vertical direction or to the left and right due to nonuniform thermal deformation caused by nonuniform heating and cooling, and a bent product having a prescribed target shape without variations can be manufactured.

Figure 13:
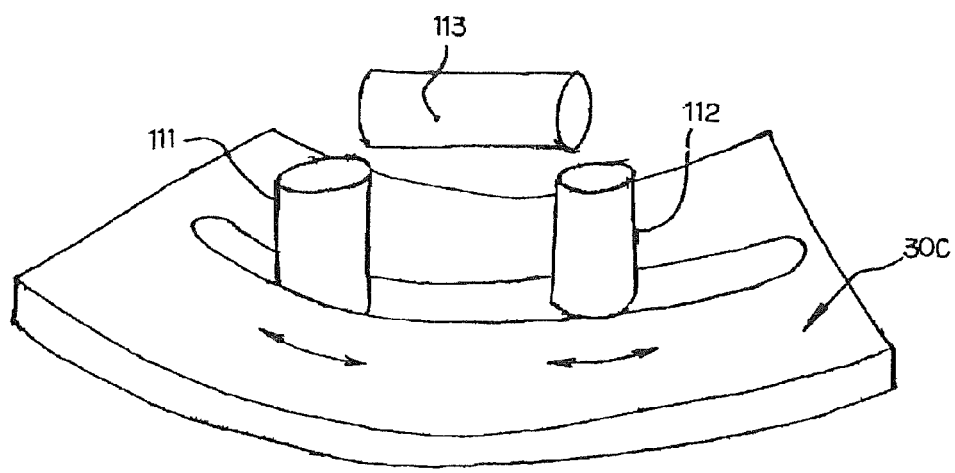
FIG. 13 is an explanatory view showing another example of a support guide.

FIG. 13 is an explanatory view showing another example of a support guide 30C according to this embodiment.

This example is almost the same as the example shown in FIG. 12, but in addition to the structure shown in FIG. 12, it has a roll 113 which guides the metal material 1 in the vertical direction.

A pressure applying means such as an air cylinder or a hydraulic cylinder may be installed on the roll 113 to apply pressure to the metal material 1. This support guide 30C guides the upper and lower surfaces and left and right surfaces of the metal material 1 on the exit side of the movable roller die 4 during bending. As a result, even if the worked portion undergoes the action of gravity of the metal material or of an additional moment in the vertical direction or to the left and right due to nonuniform thermal deformation caused by nonuniform heating and cooling, additional deformation of the metal material 1 can be prevented, and a bent product having predetermined target dimensions without variations can be manufactured.

Figure 14:
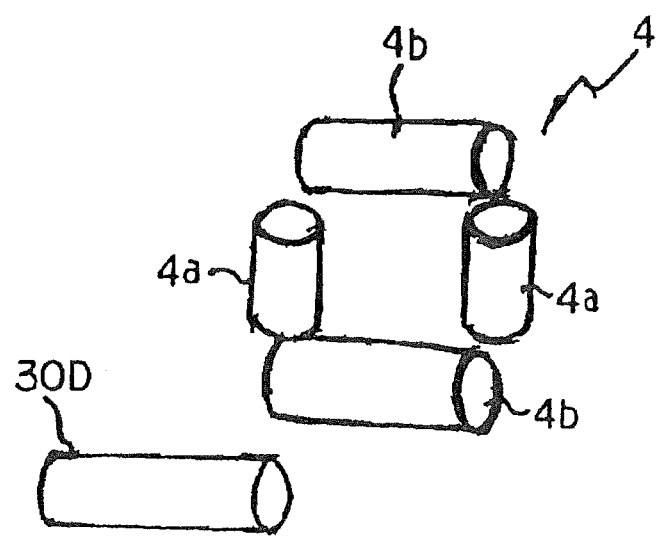
FIG. 14 is an explanatory view showing another example of a support guide.
Figure 14:
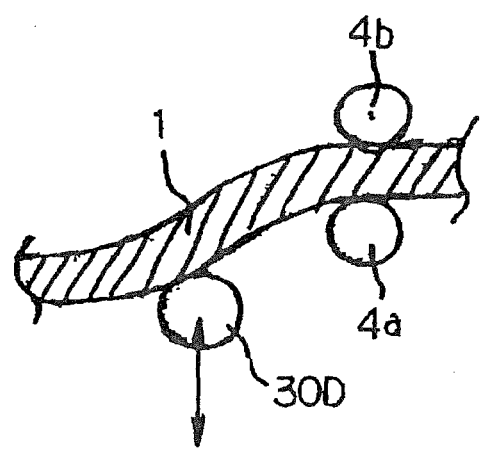

FIG. 14 is an explanatory view showing another example of a support guide 30 according to this embodiment. This is another example in which bending is carried out on a metal material 1 having a rectangular transverse cross section in the same manner as in FIG. 11, and the movable roller die 4 is of the four-roll type. A bent product with this embodiment has a completely three-dimensionally bent shape.

The movable roller die 4 moves to a prescribed spatial position during bending while positioning the end of the metal material 1 in the vertical direction and to the left and right. Namely, it is capable of horizontal shifting and left and right tilting, as well as movement in the vertical direction (referred to below as up and down shifting), and rotation in a horizontal plane (referred to below as up and down tilting).

In this embodiment, a roll-shaped active guide 30D is installed on the exit side of the movable roller die 4. The active guide 30D follows the bottom surface of the metal material 1 and continuously guides the bottom surface by moving in accordance with the movement of the metal material 1 during bending, i.e., by carrying out up and down shifting and left and right tilting. It is not necessary to carry out left and right tilting. These movements are transmitted to an unillustrated control means so as to synchronize with the feed device 3 and the movable roller die 4.

The lower surface of a metal material 1 is supported by the active guide 30D on the exit side of the movable roller die 4 during bending. Therefore, even if the worked portion undergoes the action of gravity of the metal material or of an additional moment in the vertical direction due to nonuniform thermal deformation caused by nonuniform heating and cooling, deformation of the metal material 1 can be prevented, and a bent product having prescribed target dimensions without variations can be manufactured.

Figure 15:
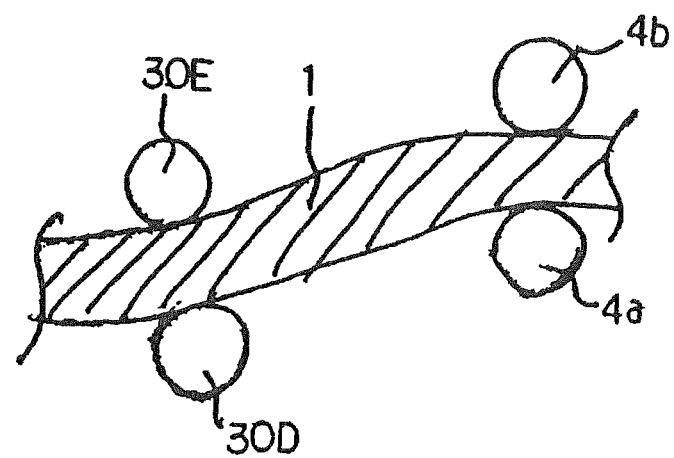
FIG. 15 is an explanatory view showing another example of a support guide.

FIG. 15 is an explanatory view showing another example of a support guide 30 according to this embodiment.

This embodiment has almost the same structure as in FIG. 7, but it additionally includes a roll 30E which guides a metal material 1 in the vertical direction.

Instead of roll 30E, it is possible to install a pressure applying means such as an air cylinder or a hydraulic cylinder. By guiding the upper and lower surfaces of the metal material 1 during bending by roll 30E on the exit side of the movable roller die 4, even if the worked portion undergoes the action of the metal material or of an additional moment in the vertical direction due to nonuniform thermal deformation caused by nonuniform heating and cooling, additional deformation of the metal material 1 can be prevented, and a bent product having a prescribed target shape without variations can be manufactured.

Figure 16:
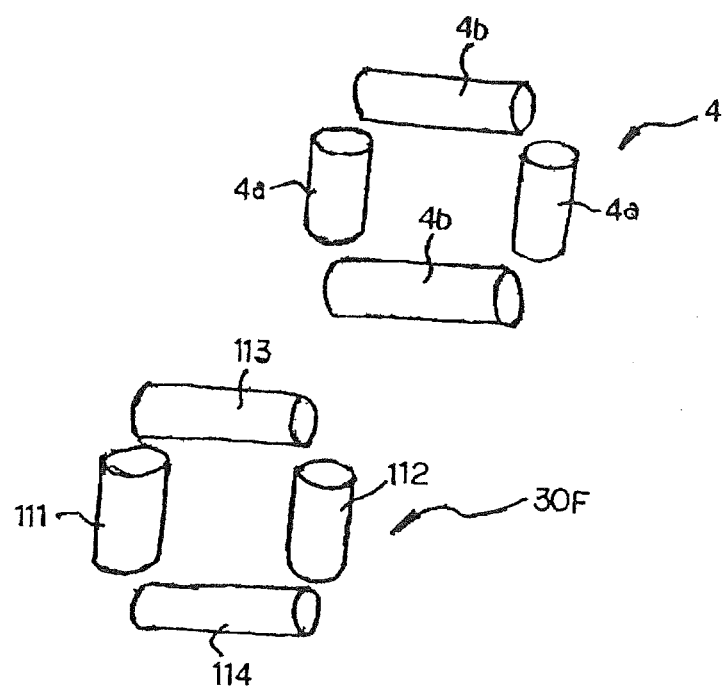
FIG. 16 is an explanatory view showing another example of a support guide.

FIG. 16 is an explanatory view of another example of a support guide 30 according to this embodiment.

This embodiment is also one in which bending is carried out on a metal material 1 which has a rectangular transverse cross section as in FIG. 11, and the movable roller die 4 is of the four-roll type. A completely three-dimensionally bent shape is imparted to the metal material 1. During bending, the movable roller die 4 carries out prescribed movement, i.e., horizontal shifting and left and right tilting, as well as up and down shifting and tilting while positioning the end of the metal material 1 in the vertical direction and to the left and right.

In the same manner as in the previous embodiments, in this embodiment, a support guide 30F having rolls 111-114 which guide a metal material 1 in the horizontal direction and the vertical direction is installed on the exit side of the movable roller die 4. The support guide 30F carries out movement in accordance with the movement of the metal material 1 during bending, i.e., it carries out horizontal shifting and left and right tilting. These movements are transmitted to an unillustrated control means so as to synchronize with the feed device 3 and the movable roller die 4.

A pressure applying means such as a hydraulic cylinder may be installed on one of rolls 111 and 112. Positioning of the lower surface and the left and right surfaces of the metal material 1 is achieved during bending on the exit side of the movable roller die 4. Therefore, even if the worked portion undergoes the action of gravity of the metal material or of an additional moment in the vertical direction or to the left and right due to nonuniform thermal deformation caused by nonuniform heating and cooling, additional deformation of the metal material 1 can be prevented, and a bent product having prescribed target dimensions without variations can be obtained.

Figure 17:
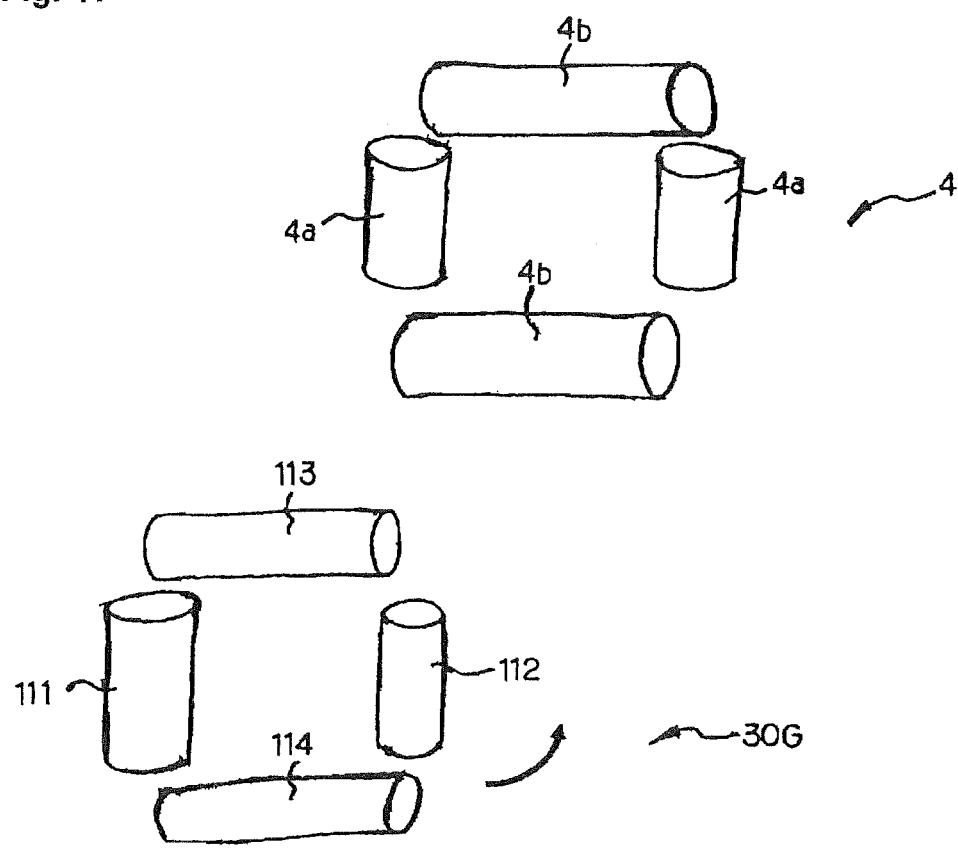
FIG. 17 is an explanatory view showing another example of a support guide.

FIG. 17 is an explanatory view showing another example of a support guide 30 according to this embodiment.

This example has almost the same structure as in FIG. 16, but in addition to the structure of FIG. 16, a twisting mechanism is added to a support guide 30G.

This movement is transmitted to an unillustrated control means so as to synchronize with the feed device 3 and the movable roller die 4 which are disposed movably also in the twisting direction.

The support guide 30G guides the upper and lower surfaces and left and right surfaces of the metal material 1 on the exit side of the movable roller die 4 during bending. Therefore, even if the worked portion undergoes the action of gravity of the metal material or of an additional moment in the vertical direction or to the left and right or even in the twisting direction due to nonuniform thermal deformation caused by nonuniform heating and cooling, additional deformation of the metal material 1 can be prevented, and a bent product having prescribed target dimensions without variations can be manufactured.

Although not shown in the drawings, as another example of support guide 30 of this embodiment, a guide member constituting the support guide 30 may be held by a general-purpose multi-axis robot such that the guide member can be moved within a prescribed space.

As explained while referring to FIGS. 11-17, three-dimensional high-accuracy positioning mechanisms may be complicated. However, by using a general-purpose multi-axis robot, it is possible to move a guide member in a prescribed space with a relatively simple structure. At any rate, it can be determined whether to use a general-purpose multi-axis robot taking into consideration the stiffness and the like of the specific apparatus based on the required accuracy, the mass, and the shape of a product being formed by bending.

Figure 18:
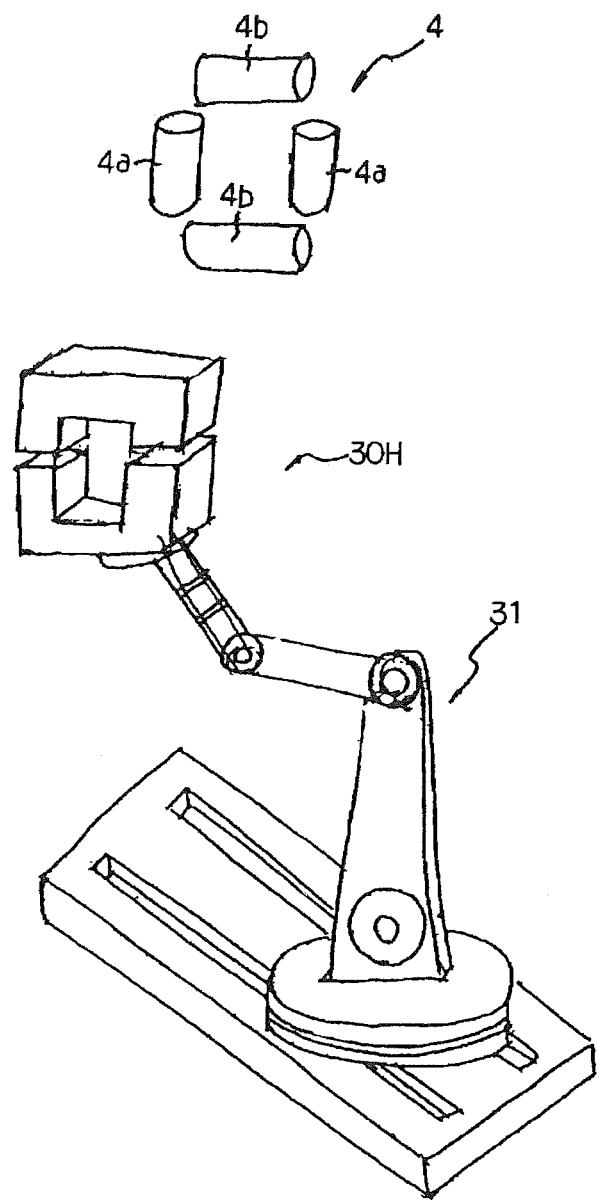
FIG. 18 is an explanatory view showing another example of a support guide.

FIG. 18 is an explanatory view of another example of a support guide 30 according to this embodiment.

In this example, bending is carried out on a metal material 1 having a rectangular cross section as in FIG. 11, and the movable roller die 4 is a four-roll type. The bent product has a completely three-dimensionally bent shape. Namely, during bending, the movable roller die 4 moves to a prescribed spatial position by carrying out horizontal shifting and left and right tilting, as well as up and down shifting and up and down tilting while positioning the end of a metal material 1 in the vertical direction and to the left and right.

In contrast to the previous examples, in this example, the end of a metal material 1 is completely gripped by a support guide 30H which is held by a multi-axis robot 31, and the multi-axis robot 31 moves in accordance to the feeding of the metal material 1 so as to completely synchronize its three-dimensional position. In accordance with the movement of the metal material 1 during bending, the support guide 30H carries out movement of its spatial position, namely, by horizontal shifting and left and right tilting and twisting. These movements are transferred to an unillustrated control means and are synchronized with the operation of the feed device 3 and the movable roller die 4.

The front end of the metal material 1 is held by the support guide 30H on the exit side of the movable roller die 4. Therefore, even if the worked portion undergoes the action of gravity of the metal material or of an additional moment in the vertical direction or to the left and right due to nonuniform thermal deformation caused by nonuniform heating and cooling, additional deformation of the metal material 1 can be prevented, and a bent product having prescribed target dimensions without variations can be manufactured.

(VI) Articulated Robot

Figure 19:
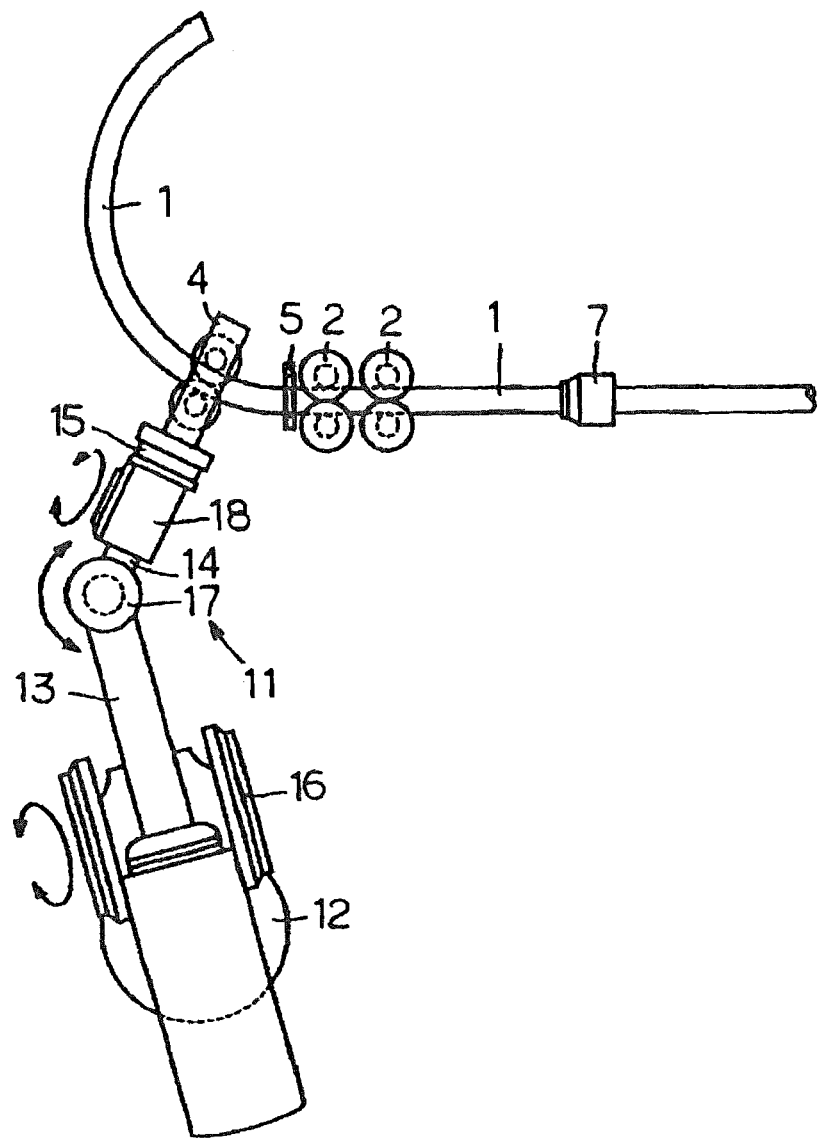
FIG. 19 is an explanatory view showing the structure of an articulated robot which can be used in a manufacturing apparatus of an embodiment.

FIG. 19 is an explanatory view showing the structure of an articulated robot 11 which can be used in a manufacturing apparatus 0 of the embodiment.

As shown in FIG. 19, an articulated robot 11 for holding a movable roller die 4 can be disposed on the downstream side of the bending apparatus.

This articulated robot 11 has a stationary surface 12 which is secured to a work plane, three aims 13, 14, and 15 which function as main axes, and three joints 16, 17, and 18 which connect the arms 13, 14, and 15 and which functions as wrists which can rotate about the axes. A movable roller die 4 is installed on arm 15 at the end of the articulated robot 11.

Figure 20:
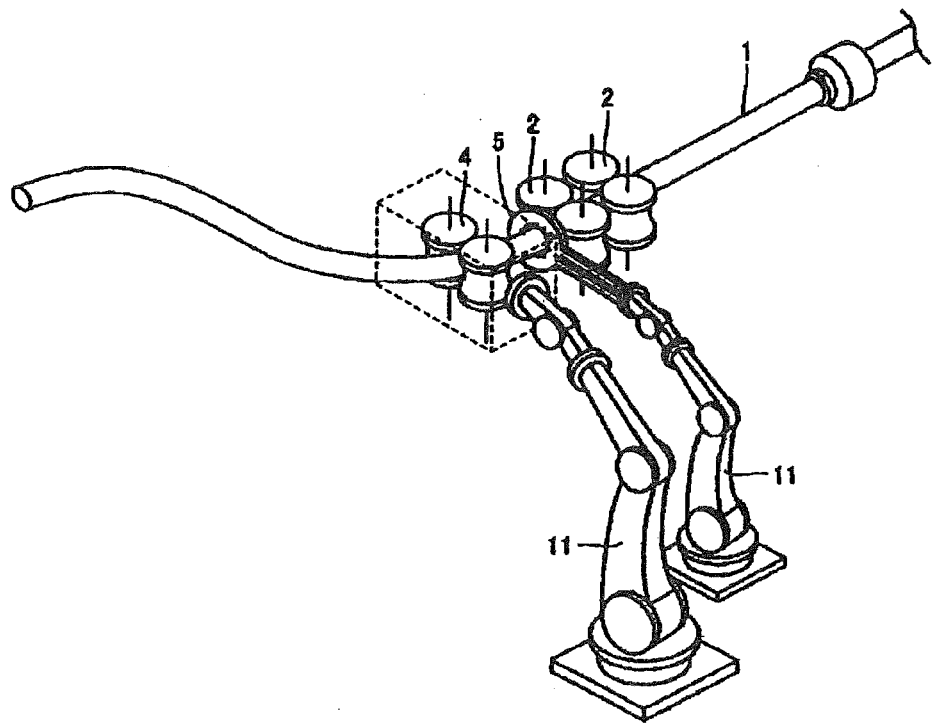
FIG. 20 is an explanatory view showing an example of the structure of another articulated robot which can be used in a manufacturing apparatus of an embodiment.

FIG. 20 is an explanatory view showing another example of the structure of an articulated robot used in a manufacturing apparatus 0 of this embodiment.

In the manufacturing apparatus 0 shown in FIG. 19, only an articulated robot 11 for holding the movable roller die 4 is provided. However, an articulated robot 11 for the heating device 5 and the cooling device 6 may also be provided. By providing these articulated robots 11, the efficiency of bending can be further increased.

In this manufacturing apparatus 0, by providing at least one articulated robot 11 having three joints which can each rotate about an axis, when carrying out bending of a metal material 1, movements such as bending, rotating, and translation carried out by a shifting mechanism, a tilting mechanism, and a moving mechanism of the movable roller die 4, namely, the movements carried out by total six types of manipulators can be performed by a series of operations in response to control signals. As a result, it is possible to increase the efficiency of bending as well as to decrease the size of a working apparatus.

(VII) Bending Line

As described above, a material with a closed cross section having a round shape or the like is used as a material to be worked by a manufacturing apparatus 0 in this embodiment. Conventionally seam welded steel pipe has been used as round pipe having a closed cross section.

Figure 21:
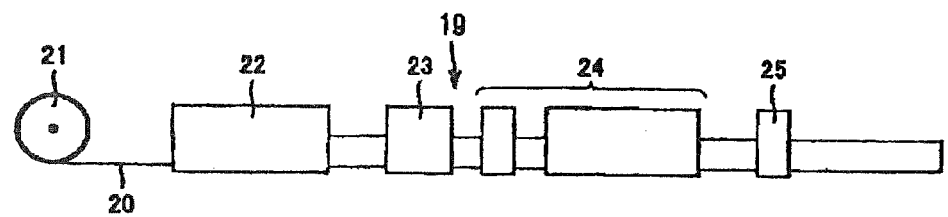
FIG. 21 is an explanatory view showing an overall manufacturing process for a seam welded steel pipe which is one example of a material being worked.

FIG. 21 is an explanatory view of the overall manufacturing process of a seam welded steel pipe which is an example of a material being worked.

A manufacturing process 19 for a seam welded steel pipe constitutes an apparatus for manufacturing a steel pipe from a steel strip 20. As shown in the figure, an uncoiler 21 which continuously pays off a steel strip 20 from a roll, a forming means 22 having a plurality of roll formers which form the uncoiled steel strip 20 into a pipe having a predetermined cross-sectional shape, a welding means 23 having a welding machine which welds both edges of the steel strip which have been abutted against each other to obtain a tubular shape and continuously form a pipe, an after-treatment means 24 comprising a weld bead cutting machine and a post-annealer and capable of forming the continuous pipe into a predetermined size, and a cutting means 25 having a running cutter which cuts the pipe which is given a predetermined size into a desired length are sequentially arranged from the upstream side towards the downstream side.

Figure 22:
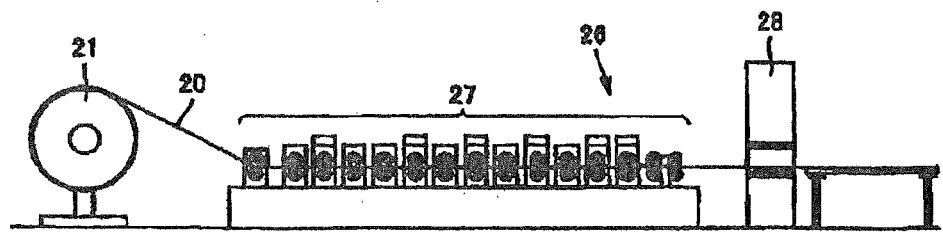
FIG. 22 is a view showing the overall structure of a roll forming process used in manufacturing a material being worked.

FIG. 22 shows the overall structure of a roll forming process used in manufacturing a material being worked.

The roll forming process 26 constitutes an apparatus for forming a steel strip 20 into a predetermined shape. For this purpose, it comprises an uncoiler 21 around which a metal material in the form of a steel strip 20 is wrapped and which pays off the steel strip 20, a forming means 27 having a roll former which forms the steel strip 20 which is paid off by the uncoiler 21 into a predetermined shape, and a cutting means 28 having a running cutter which continuously cuts the steel strip 20 which was formed into a predetermined shape by the roll former to a desired length.

A material being worked which is manufactured by the manufacturing process 19 for a seam welded steel pipe shown in FIG. 21 or the roll forming process 26 shown in FIG. 22 is supplied to a bending apparatus as a metal material being worked. If the continuous line of this process and the bending apparatus are separated from and independent of each other, due to differences in the processing speed of the line and the apparatus, it becomes necessary to provide a place for stocking the material being worked. In addition, it is necessary to transport the material being worked between each line and the apparatus, and it becomes necessary to provide an auxiliary transport means such as a crane or a truck.

In a manufacturing apparatus of this embodiment, by disposing a manufacturing apparatus 0 of this embodiment on the exit side of a manufacturing process 19 for a seam welded pipe or a roll forming process 26, the overall manufacturing line from supply of the material being worked to the manufacture of a bent product can be made compact. In addition, by suitably setting the operating conditions, a product formed by working having excellent accuracy can be efficiently and inexpensively manufactured.

In this manner, according to this embodiment, even when carrying out bending which requires a variety of bent shapes and in which the bending direction of a metal material varies two-dimensionally or three-dimensionally, or even when it is necessary to perform bending of a high strength metal material, the metal material can be uniformly cooled, so a bent product having a high strength, good shape retention, and a uniform hardness distribution can be efficiently and inexpensively manufactured.

In addition, a movable roller die can support a metal material while feeding it in its axial direction, so the occurrence of seizing scratches in the surface of the movable roller die can be suppressed, bending accuracy can be guaranteed, and bending with excellent operating efficiency can be carried out. As a result, the present invention can be widely employed as a bending technique for automotive parts which are becoming increasingly strong.

Figure 23:
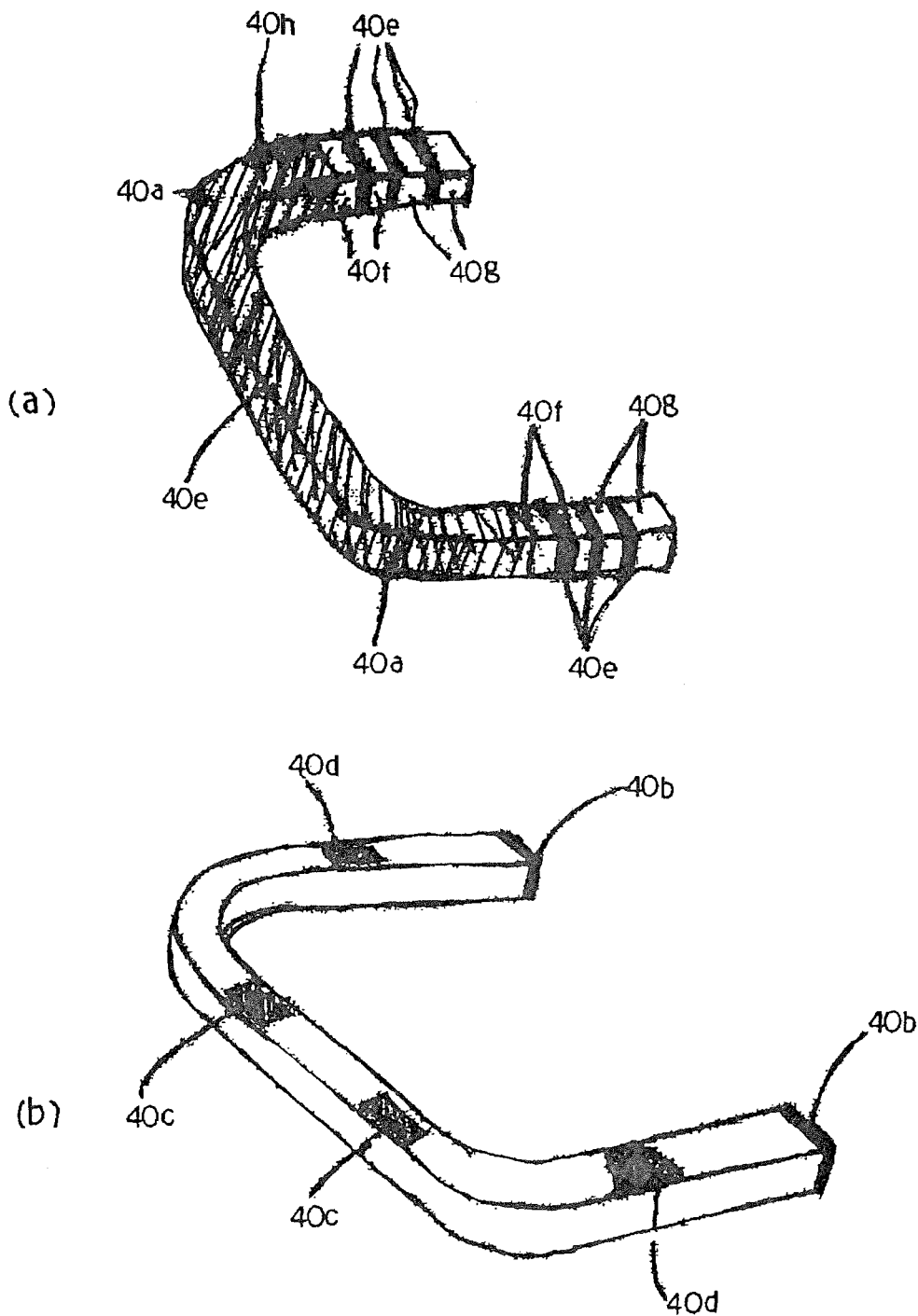
FIGS. 23(a) and 23(b) are explanatory views showing a unitary side member/bumper reinforcing component 40 which is one example of a strength member for an automobile body which is manufactured in an embodiment.

FIGS. 23(a) and 23(b) are explanatory views showing a side member/bumper reinforcing member unitary component 40 which is one example of a strength member for an automobile body manufactured by this embodiment.

As shown in these figures, this unitary component 40 is formed by a tubular body 40h having a closed cross section without an outwardly-extending flange and having bent portions 40a which are bent two-dimensionally or three-dimensionally.

The below-described embodiments of a strength member for an automobile body have a tubular body without a flange, so they occupy less space and are lighter in weight. In addition, due to stable buckling behavior at the time of application of an impact load in the axial direction, they absorb an increased amount of impact energy.

The tubular body 40h has an ultra-high strength heat treated portions 40e (the hatched portions) which have been heat treated to have a tensile strength exceeding 1100 MPa. In addition, in portions other than the ultrahigh strength heat treated portions, the tubular body has portions 40f and 40g which function as deformation-promoting portions with respect to an impact load applied at the time of a collision of a vehicle. These portions may be high strength heat treated portions 40f and 40g which have been heat treated so as to have a tensile strength of at least 600 MPa and at most 1100 MPa, or low strength heat treated portions 40f and 40g having a tensile strength of 600 MPa, or a combination of high strength heat treated portions 40f which have been heat treated so as to have a tensile strength of at least 600 MPa and at most 1100 MPa and low strength heat treated portions 40g having a tensile strength of 600 MPa.

With this structure, the bent portions 40a where loads are concentrated at the time of an impact have high resistance to deformation, and the end portions where the ultra-high strength heat treated portions 40e and the high strength heat treated portions 40f are alternatingly provided can effectively absorb energy by buckling and plastically deforming into the shape of an accordion at the time of an impact.

The heat treatment and strength and the like of portions other than the ultra-high strength heat treated portions 40e can be suitably determined taking into consideration the performance required of a strength member for an automobile body. Operating conditions vary in accordance with the capacity of manufacturing equipment, the shape of the high frequency heating coil 5 and the cooling device 6, and the shape and the wall thickness of the manufactured product, so suitable conditions can be determined by previous check tests.

In any case, by combining the below-described heating and cooling, the hardness of each portion of a strength member for an automobile body can easily be set to a desired value.

FIG. 23(b) is an explanatory view showing portions to be cut 40b, portions to be punched 40c, and portions to be welded 40d of a tubular body 40h. By performing heat treatment so that the portions to be cut 40b and the portions to be punched 40c have a tensile strength of less than 600 MPa, wear of tools for carrying out cutting and punching of a product can be decreased, and the lifespan of tools can be increased. Here, "heat treatment" includes the case in which portions of a material are not locally heated so that those portions will have the strength of an untreated material. By performing heat treatment such that the tensile strength of the portions to be welded 40d is less than 600 MPa (again □ heat treatment□ including the case in which local heating is not carried out on portions of the material, and those portions retain their initial strength), it is possible to increase the reliability of welding in subsequent steps.

In this manner, it is effective to have a bent portion 40a which is bent two-dimensionally or three-dimensionally and a tubular body 40h having a closed cross section without an outwardly-extending flange in which the tubular body 40h is heat treated such that it has ultra-high strength heat treated portions 40e which have been heat treated so as to have a tensile strength of at least 1100 MPa while a portion to be cut 40b, a portion to be punched 40c, and a portion to be welded 40d have a tensile strength of less than 600 MPa. It is still more effective to include a high strength heat treated portion 40e, or low strength heat treated portions 40b-40d, or a high strength heat treated portion 40e and low strength heat treated portions 40b-40d for promoting deformation under an impact load.

FIGS. 24(a)-24(e) are explanatory views showing front side members 41A-41E which are examples of a strength member for an automobile body manufactured by this embodiment.

Figure 24:
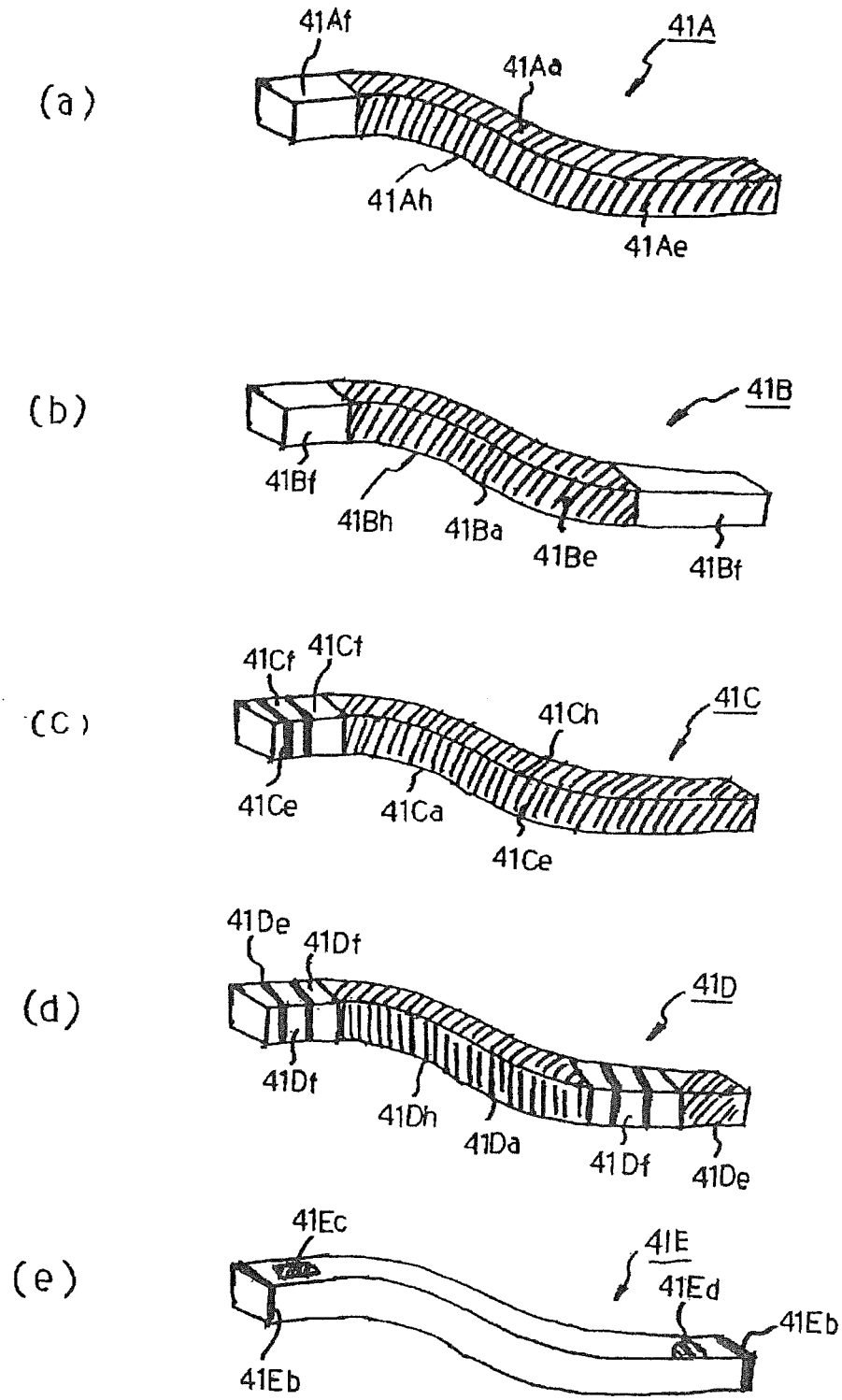
FIGS. 24(a)-24(e) are explanatory views showing a front side member.

The front side member 41A shown in FIG. 24(a) has a tubular body 41Ah which has a closed cross section without an outwardly-extending flange and a bent portion 41Aa which is bent two-dimensionally or three-dimensionally.

The tubular body 41Ah has an ultra-high strength heat treated portion 41Ae (hatched portion) which has been heat treated to have a tensile strength exceeding 1100 MPa and a high strength heat treated portion 41Af which is the portion of the tubular body other than the ultra-high strength heat treated portion 41Ae and which has been heat treated to have a tensile strength of at least 600 MPa and at most 1100 MPa.

With this structure, when an impact load is applied to the front end portion (the left hand portion in the figure), the tensile strength of the bent portion 41Aa is an ultra-high strength exceeding 1100 MPa, so the occurrence of bending deformation of the bent portion 41a in an early stage is suppressed. As a result, the high strength heat treated portion 41Af at the front end plastically deforms by buckling into an accordion shape due to an impact load applied at the time of a collision, whereby impact energy can be effectively absorbed.

Impact energy can also be effectively absorbed when the front end portion 41Af is made a low strength heat treated portion.

The front side member 41B shown in FIG. 24(b) has a bent portion 41Ba which is bent two-dimensionally or three-dimensionally and a tubular body 41Bh which has a closed cross section without an outwardly-extending flange.

The tubular body 41Bh has an ultra-high strength heat treated portion 41Be (hatched portion) which has been heat treated to have a tensile strength exceeding 1100 MPa and high strength heat treated portions 41Bf, 41Bf which are portions other than the ultra-high strength heat treated portion 41Be and which have been heat treated so as to have a tensile strength of at least 600 MPa and at most 1100 MPa.

With this structure, the same effect as for the front side member 41A shown in above-described FIG. 24(a) is obtained. In addition, as it has a high strength heat treated portion 41Bf at the rear end which is connected to a dash panel, the rear end portion can absorb an impact load. Therefore, the total absorbed energy can be increased, and when an impact load is applied, the front side member 41B can prevent to the dash panel in an early stage.

Impact energy can be more effectively absorbed if the high strength heat treated portion 41Bf at the front end is made a low strength heat treated portion. In addition, if the high strength heat treated portion 41Bf at the front end is made a low strength heat treated portion and the high strength heat treated portion 41Bf at the rear end is made a high strength heat treated portion, the crushing mode at the time of crushing in the axial direction can be effectively controlled while increasing the impact energy.

The front side member 41C shown in FIG. 24(c) comprises a tubular body 41Ch which has a closed cross section without an outwardly-extending flange and a bent portion 41Ca which is bent two-dimensionally or three-dimensionally.

The tubular body 41Ch comprises ultra-high strength heat treated portions 41Ce (hatched portions) which have been heat treated to have a tensile strength exceeding 1100 MPa and high strength heat treated portions 41Cf which are the portions other than the ultra-high strength heat treated portions 41Ce and which have been heat treated to have a tensile strength of at least 600 MPa and at most 1100 MPa.

With this structure, the same effect as for the front side member 41A shown in above-described FIG. 24(a) is obtained, and as it has ultra-high strength heat treated portions 41Ce and high strength heat treated portions 41Cf alternating in the axial direction at its front end, impact energy can be effectively absorbed by plastic deformation by buckling into an accordion shape when an impact load is applied to the front end at the time of a collision.

If the high strength heat treated portions 41Cf at the front end are made low strength heat treated portions, impact energy can be more effectively absorbed.

The front side member 41D shown in FIG. 24(d) comprises a tubular body 41Dh having a closed cross section without an outwardly-extending flange and a bent portion 41Da which is bent two-dimensionally or three-dimensionally.

The tubular body 41Dh has ultra-high strength heat treated portions 41De (hatched portion) which have been heat treated so as to have a tensile strength exceeding 1100 MPa, and high strength heat treated portions 41Df which are the portions other than the ultra-high strength heat treated portions 41De which have been heat treated so as to have a tensile strength of at least 600 MPa and at most 1100 MPa.

With this structure, when an impact load is applied, bending deformation of the bent portion 41Da in an early stage is suppressed and damage to the dash panel in an early stage can be prevented. In addition, impact energy can be effectively absorbed by the front end plastically deforming by buckling into an accordion shape under an impact load applied at the time of a collision. Furthermore, the high strength heat treated portions 41Df can also absorb an impact load, so a high level of energy absorption is obtained. Impact energy can be absorbed with high efficiency even in the case of a small vehicle which does not have a crash box provided at its front end.

Impact energy can be more effectively absorbed if the high strength heat treated portions 41Df at the front end are made low strength heat treated portions. In addition, by making the high strength heat treated portions 41Df at the front end low strength heat treated portion and making 41Df at the rear end a high strength heat treated portion, the mode of crushing can be effectively controlled while increasing the impact energy.

FIG. 24(e) is an explanatory view showing portions to be cut 41Eb, a portion to be punched 41Ec, and a portion to be welded 41Ed of a front side member 41E.

As shown in FIG. 24(e), by performing heat treatment such that 41Eb and the portion to be punched 41Ec have a tensile strength of less than 600 MPa (heat treatment including the case in which some portions are not heated and the material retains its strength in an untreated state), wear of tools at the time of cutting or punching of a product is reduced, and the lifespan of tools can be increased. In addition, by performing heat treatment of the portion to be welded 41Ed so as to have a tensile strength of less than 600 MPa (heat treatment including the case in which some portions are not heated and the strength of those portions remains that of the untreated material), the reliability of welding in subsequent steps can be increased.

In this manner, it is effective to form a front side member from a bent portion 41Aa-41Da which is bent two-dimensionally or three-dimensionally and a tubular body 41Ah-41Dh having a closed cross section which does not have an outwardly-extending flange and to perform heat treatment on the tubular body 41Ah-41Dh so as to have an ultrahigh strength heat-treated portion 41Ae-41De which has been heat treated so as to have a tensile strength exceeding 1100 MPa and to heat treat a portion to be cut 41Eb, a portion to be punched 41Ec, and a portion to be welded 41Ed so as to have a tensile strength of less than 600 MPa. In addition, as shown in FIGS. 24(a)-24(d), it is effective to have a combination of a high strength heat-treated portion 41Ae-41De for promoting deformation under an impact load, or a low strength heat-treated portion 41Af-41Df, or a combination of a high strength heat-treated portion 41Ae-41De and a low strength heat-treated portion 41Af-41Df.

In this embodiment, the present invention was applied to a front side member, but it is possible for the present invention to be a so-called crash box having the same structure as the front end portion shown in FIGS. 24(c) and 24(d) Furthermore, by combining bent portions, good energy absorbing properties unlike those obtained in the past can be achieved.

FIGS. 25(a) and 25(b) are explanatory views of B-pillars 42A and 42B which are examples of a strength member for an automobile body manufactured in this embodiment.

The B-pillar 42A shown in FIG. 25(a) has a tubular body 42Ah which has a closed cross section without an outwardly-extending flange and which includes a bent portion 42Aa which is bent two-dimensionally or three-dimensionally, portions to be cut 42Ab, a portion to be punched 42Ac, and a portion to be welded 42Ad.

The tubular body 42Ah has an ultrahigh strength heat-treated portion 42Ae which has been heat treated so as to have a tensile strength exceeding 1100 MPa, and a high strength heat-treated portion 42Af which is the portion other than the ultrahigh strength heat-treated portion 42Ae and which has been heat treated so as to have a tensile strength of at least 600 MPa and at most 1100 MPa.

The B-pillar 42B shown in FIG. 25(b) has a tubular body 42Bh which has a closed cross section without an outwardly-extending flange and which has a bent portion 42Ba which is bent two-dimensionally or three-dimensionally, a portion to be cut 42Bb, a portion to be punched 42Bc, and a portion to be welded 42Bd.

The tubular body 42Bh comprises ultrahigh strength heat-treated portions 42Be which have been heat treated so as to have a tensile strength exceeding 1100 MPa and a high strength heat-treated portion 42Bf which is the portion other than the ultrahigh strength heat-treated portions 42Be, 42Be and which has been heat treated so as to have a tensile strength of at least 600 MPa and at most 1100 MPa.

With this structure, the amount of displacement into the passenger compartment of the upper portion of the B-pillar at the time of a side impact can be suppressed, injury to the heads of passengers can be decreased, and damage in the center of the height of the B-pillar at the time of a side impact can be suppressed.

FIGS. 26(a) and 26(b) are explanatory views of cross members 43A and 43B which are examples of a strength member for an automobile body manufactured by this embodiment.

The cross member 43A shown in FIG. 26(a) comprises a tubular body 43Ah having a closed cross section without an outwardly-extending flange and including a bent portion 43Aa which is bent two-dimensionally or three-dimensionally, portions to be cut 43Ab, portions to be punched 3Ac, and portions to be welded 43Ad.

The tubular body 43Ah has an ultrahigh strength heat-treated portion 43Ae which has been heat treated so as to have a tensile strength exceeding 1100 MPa, and a high strength heat-treated portion 43Af which is the portion other than the ultrahigh strength heat-treated portion 43Ae and which has been heat treated so as to have a tensile strength of at least 600 MPa and at most 1100 MPa.

The cross member 43B shown in FIG. 26(b) comprises a tubular body 43Bh having a closed cross section without an outwardly-extending flange and having a bent portion 43Ba which is bent two-dimensionally or three-dimensionally, portions to be cut 43Bb, portions to be punched 43Bc, and portions to be welded 43Bd.

The tubular body 43Bh has an ultrahigh strength heat-treated portion 43Be which has been heat treated so as to have a tensile strength of at least 1100 MPa and high strength heat-treated portions 43Bf which are the portions other than the ultrahigh strength heat-treated portion 43Be and which have been heat treated so as to have a tensile strength of at least 600 MPa and at most 1100 MPa.

With this structure, the strength of the central portion of the cross member can be increased, and the resistance to crushing in the axial direction at the time of a side impact can be increased.

Figure 27:
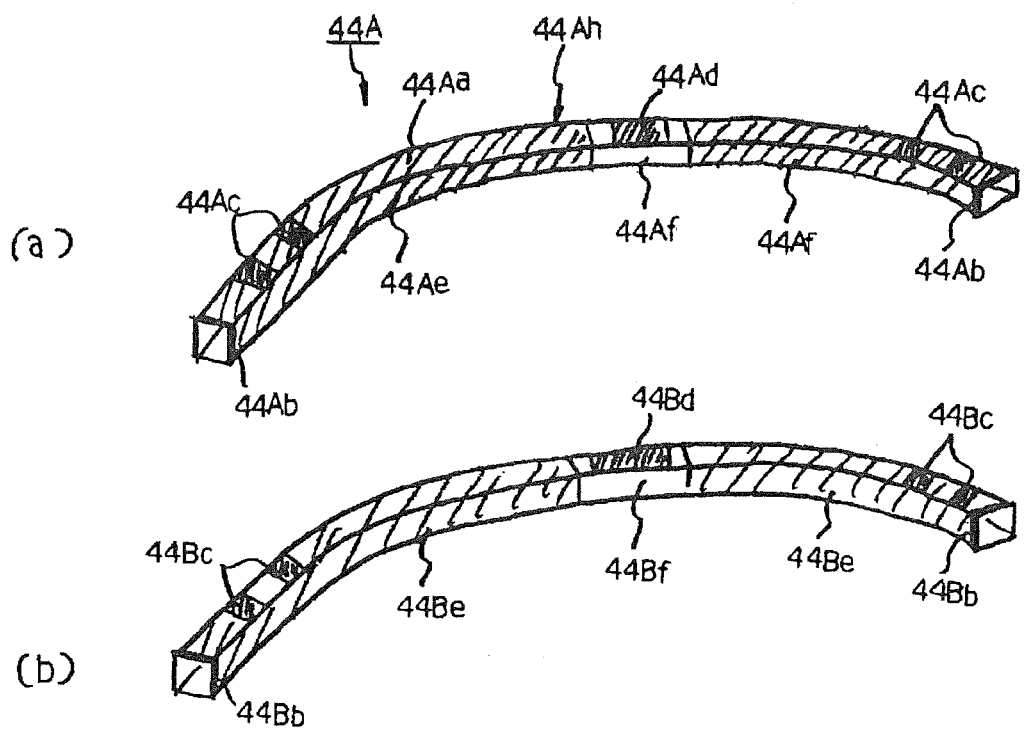
FIGS. 27(a) and 27(b) are explanatory views showing a unitary A-pillar/roof rail side member.

FIGS. 27(a) and 27(b) are explanatory views showing A-pillar/roof rail side unitary parts 44A and 44B which are examples of a strength member for an automobile body manufactured by this embodiment.

The unitary part 44A shown in FIG. 27(a) comprises a tubular body 44Ah which has a closed cross section without an outwardly-extending flange and includes a bent portion 44Aa which is bent two-dimensionally or three-dimensionally, portions to be cut 44Ab, portions to be punched 44Ac, and portions to be welded 44Ad.

The tubular body 44Ah has ultrahigh strength heat-treated portions 44Ae which have been heat treated so as to have a tensile strength exceeding 1100 MPa and a high strength heat-treated portion 44Af which is the portion other than the ultrahigh strength heat-treated portions 44Ae and which has been heat treated so as to have a tensile strength of at least 600 MPa and at most 1100 MPa.

The unitary part 44B shown in FIG. 27(b) comprises a tubular body 44Bh which has a closed cross section without an outwardly-extending flange and includes a bent portion 44Ba which is bent two-dimensionally or three-dimensionally, portion to be cuts 44Bb, portions to be punched 44Bc, and a portion to be welded 44Bd.

The tubular body 44Bh has ultrahigh strength heat-treated portions 44Be which have been heat treated so as to have a tensile strength exceeding 1100 MPa and a high strength heat-treated portion 44Bf which is the portion other than the ultrahigh strength heat-treated portions 44Be and which has been heat treated so as to have a tensile strength of less than 600 MPa.

With this structure, the bonding strength between a roof rail side member and an A-pillar or a B-pillar can be increased.

Figure 25:
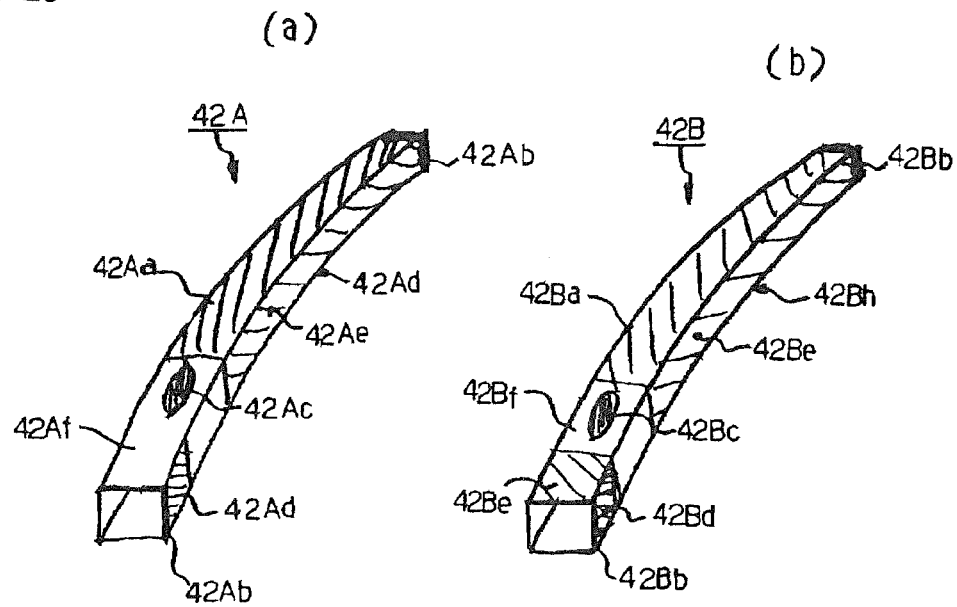
FIGS. 25(a) and 25(b) are explanatory views showing a B-pillar.
Figure 26:
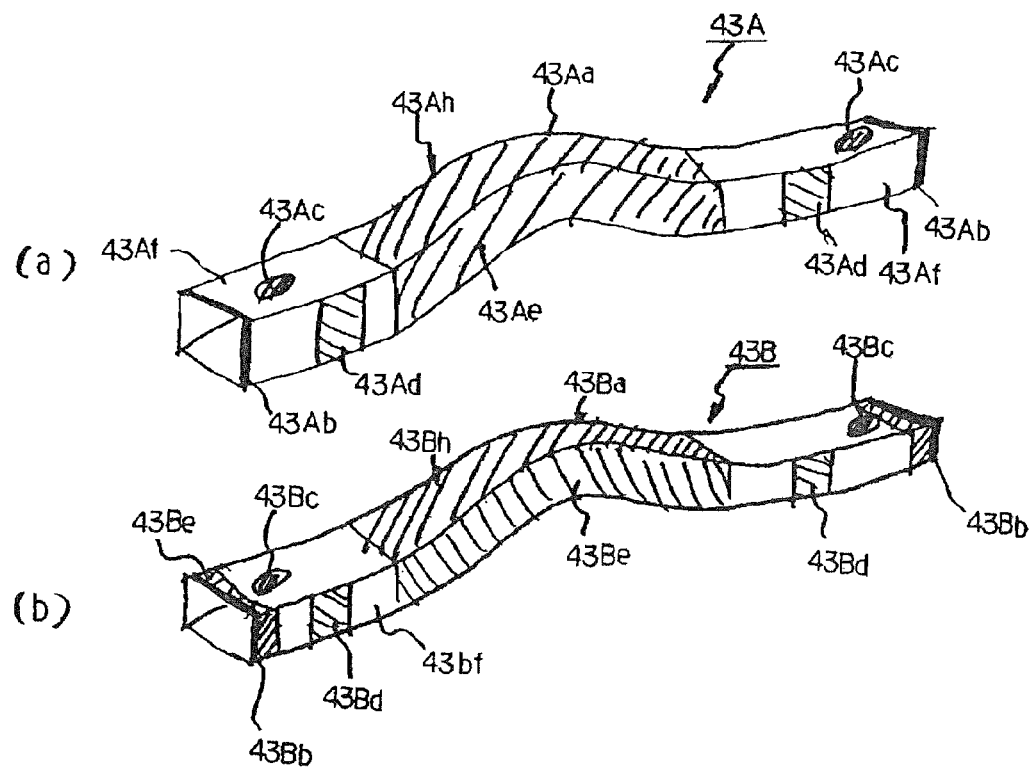
FIGS. 26(a) and 26(b) are explanatory views showing a cross member.

It is also possible to make the B-pillar shown in FIG. 25 and the cross member shown in FIG. 26 into a unitary part, or to connect the upper portion of two B-pillars by a bar disposed on the inner surface of the roof and to faun them into a unitary part, or to form the B-pillar on one side and a portion of a bar disposed on the inner surface of the roof and a portion of a cross member into a unitary part.

Figure 28:
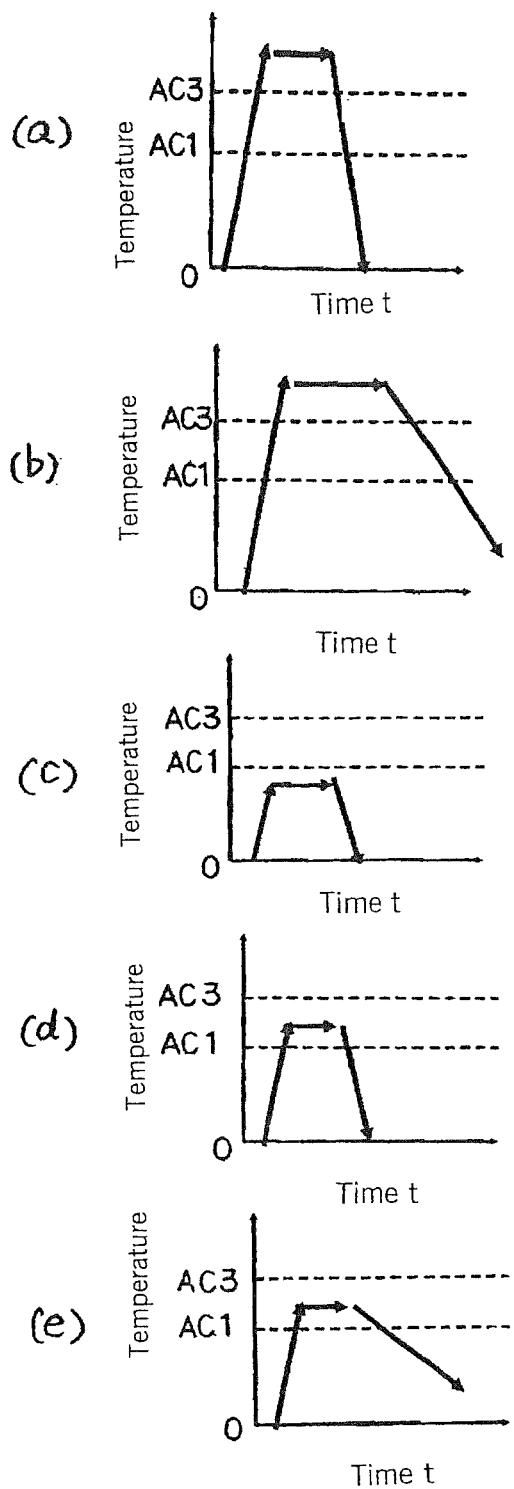
FIG. 28(a) is a graph showing the normal quenching conditions for rapid cooling after heating to at least the $Ac_3$ point.
FIG. 28(b) is a graph showing the conditions for gradual cooling after heating to at least $Ac_3$ point.
FIG. 28(c) is a graph showing the conditions for rapid cooling after heating to at most the $Ac_1$ point.
FIG. 28(d) is a graph showing the conditions for rapid cooling after heating to a temperature range from at least the $Ac_1$ point to at most the $Ac_3$ point.
FIG. 28(e) is a graph showing the conditions for gradual cooling after heating to a temperature range from at least the $Ac_1$ point to at most the $Ac_3$ point.

FIG. 28(a) is a graph showing usual quenching conditions obtained by rapid cooling after heating to at least the $Ac_3$ point. FIG. 28(b) is a graph showing conditions in which cooling is performed at a cooling rate which is lower than the cooling rate shown in FIG. 28(a) after heating to at least the $Ac_3$ point. FIG. 28(c) is a graph showing conditions of rapid cooling after heating to a temperature lower than the $Ac_1$ point. FIG. 28(d) is a graph showing conditions of rapid cooling after heating to a temperature range of at least the $Ac_1$ point to at most the $Ac_3$ point. FIG. 28(e) is a graph showing conditions of cooling at a cooling rate lower than the cooling rate shown in FIG. 28(d) after heating to a temperature range of at least the $Ac_1$ point and at most the $Ac_3$ point.

Heat treatment which is carried out when manufacturing a reinforcing member according to the present invention is carried out by carrying out usual quenching as shown in FIG. 28(a) and under the conditions shown in FIGS. 28(b)-28(e) by suitably controlling the operation of the high-frequency heating coil 5 and the cooling device 6 in the above-described manufacturing apparatus 0.

For example, by locally carrying out usual quenching as shown in FIG. 28(a), a desired ultra-high strength (for example, 1500-1650 MPa for a 100% martensite structure steel, 1300 MPa for a 55 k steel, 1200 MPa for a 44 k steel) can be obtained on the quenched portion, and by turning the high frequency coil 5 off and not carrying out heat treatment locally, a portion of the pipe which is not quenched can remain to have the initial strength of the untreated pipe (for example, 500-600 MPa for a quench-hardenable steel of ferrite and pearlite two-phase structure, 550 MPa for a 550 MPa steel, and 450 MPa for a 450 MPa steel).

By performing heating corresponding to usual quenching and then cooling at a decreased cooling rate as shown in FIG. 28(b), a high strength which is slightly lower than the above-described ultra-high strength can be achieved (for example, 1400-1500 MPa for a quench-hardenable steel of two-phase structure comprising martensite and a minute amount of ferrite, 700-900 MPa for a 550 MPa steel, and 600-800 MPa for a 450 MPa steel). Specifically, by entirely or partially closing off the holes in a water cooling jacket of the water cooling device 6 using solenoid valves, for example, it is possible to provide portions which are not water cooled. Since the cooling rate varies with the surrounding temperature, experiments can be previously carried out based on the manufacturing conditions to determine a method of water cooling.

As shown in FIG. 28(c), by heating to at most the $Ac_1$ point and then cooling at a cooling rate which is the same as the cooling rate for normal quenching, a desired strength which is somewhat higher than the strength of the base metal can be obtained (for example, a strength slightly higher than 500-600 MPa for a quench-hardenable steel of ferrite and pearlite two phase structure, a strength slightly higher than 550 MPa for a 550 MPa steel, and a strength slightly higher than 450 MPa for a 450 MPa steel). In the case of an untreated pipe having a large strain produced during pipe forming, the strength after heat treatment is sometimes lower than that of the untreated pipe, but in general the strength is slightly increased by dissolution of cementite. Taking into consideration the responsiveness of control of the high frequency heating coil 5 when carrying out the above-described on-off control, variations in the output of the power supply for heating are reduced by this heat treatment method. Therefore, the response to temperature variations is rapid, and the transition zone of changes in strength become small, so this method is effective from a practical standpoint.

As shown in FIG. 28(d), by heating to at least the $Ac_1$ point and at most the $Ac_3$ point and then cooling at the same cooling rate as for usual quenching, a strength between the ultra-high strength obtained by usual quenching and the strength of an untreated pipe can be obtained (600-1400 MPa for quench-hardenable steel, 550-1300 MPa for 55 k steel, and 450-1200 MPa for 450 MPa steel). In this case, a two-phase structure of ferrite and martensite is formed, so in general, the manufacturing method is somewhat unstable and difficult to control. However, depending upon the shape, dimensions, and use of the product, an appropriate strength can be obtained.

As shown in FIG. 28(e), by heating to at most the $Ac_1$ point and then cooling at a cooling rate which is slower than the cooling rate for usual quenching, a strength between the ultra-high strength due to usual quenching and the strength of the untreated pipe can be obtained (a strength somewhat lower than 600-1400 MPa for quench-hardenable steel, a strength somewhat lower than 550-1300 MPa for a 550 MPa steel, and a strength somewhat lower than 450-1200 MPa for a 450 MPa steel). In this case, the strength is somewhat lower than the case shown in FIG. 28(d), but control is fairly stable.

For example, in the case of a steel pipe with a square cross section with cross-sectional dimensions of 50 mm in height and 50 mm in width foamed from quench-hardenable steel with a wall thickness of 1.6 mm (C: 0.20%, Si: 0.22%, Mn: 1.32%, P: 0.016%, S: 0.002%, Cr: 0.20%, Ti: 0.020%, B: 0.0013%, remainder of Fe and impurities, $Ac_3$=825° C., $Ac_1$=720° C.) which was fed at a speed of 20 mm per second, the strength of the untreated pipe was 502 MPa, the strength of the heat-treated portion under the conditions shown in FIG. 28(a) (heating temperature of 910° C.) was 1612 MPa, the strength of the heat-treated portion under the conditions shown in FIG. 28(b) (heating temperature of 910° C.) was 1452 MPa, the strength of the heat-treated portion under the conditions shown in FIG. 28(c) (heating temperature of 650° C.) was 510 MPa, the strength of the heat-treated portion under the conditions shown in FIG. 28(d) (heating temperature of 770° C.) was 752 MPa, and the strength of the heat-treated portion under the conditions shown in FIG. 28(e) (heating temperature of 770° C.) was 623 MPa.

On the other hand, in the case of a steel pipe having a square cross section with dimensions of 50 mm high and 50 mm wide formed from a 550 MPa steel with a thickness of 1.6 mm (C: 0.14%, Si: 0.03%, Mn: 1.30%, P: 0.018%, S: 0.002%, a remainder of Fe and impurities, $Ac_3$=850° C., $Ac_1$=720° C.) which was fed at a speed of 20 mm per second, the strength of the untreated pipe was 554 MPa, the strength of the heat-treated portion under the conditions shown in FIG. 28(a) (heating temperature of 950° C.) was 1303 MPa, the strength of the heat-treated portion under the conditions shown in FIG. 28(b) (heating temperature of 950° C.) was 823 MPa, the strength of the heat-treated portion under the conditions shown in FIG. 28(c) (heating temperature of 650° C.) was 561 MPa, the strength of the heat-treated portion under the conditions shown in FIG. 28(d) (heating temperature of 800° C.) was 748 MPa, and the strength of the heat-treated portion under the conditions shown in FIG. 28(e) (heating temperature of 800° C.) was 658 MPa.

In the case of a steel pipe with a square cross section measuring 50 mm in height and 50 mm in width formed from a steel with a strength of 450 MPa and a thickness of 1.6 mm (C: 0.11%, Si: 0.01%, Mn: 1.00%, P: 0.021%, S: 0.004%, remainder of Fe and impurities, $Ac_3$=870° C., $Ac_1$=720° C.) which was fed at a speed of 20 mm per second, the strength of the untreated pipe was 445 MPa, the strength of the heat-treated portion under the conditions shown in FIG. 28(a) (heating temperature of 980° C.) was 1208 MPa, the strength of the heat-treated portion under the conditions shown in FIG. 28(b) (heating temperature of 980° C.) was 737 MPa, the strength of the heat-treated portion under the conditions shown in FIG. 28(c) (heating temperature of 650° C.) was 451 MPa, the strength of the heat-treated portion under the conditions shown in FIG. 28(d) (heating temperature of 800° C.) was 629 MPa, and the strength of the heat-treated portion under the conditions shown in FIG. 28(e) (heating temperature of 800° C.) was 612 MPa.

Second Embodiment

Next, a second embodiment will be explained.

Figure 29:
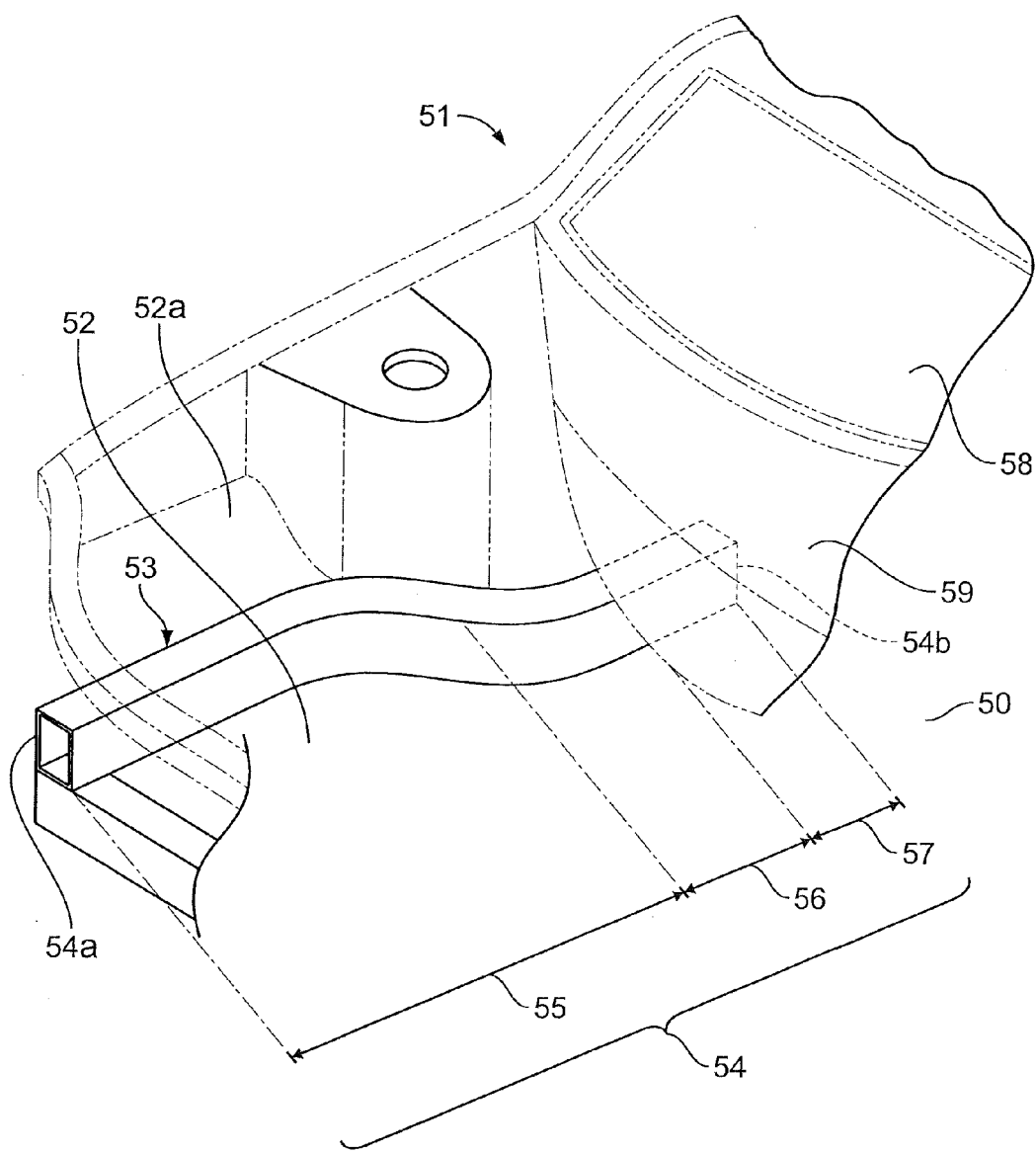
FIG. 29 is an explanatory view showing a front side member which extends generally horizontally in the fore and aft directions and which is welded to the left and right side wall portions inside an engine compartment of an automobile body.

FIG. 29 is an explanatory view showing a front side member 53 which extends generally horizontally in the fore and aft direction and which is welded to a side (vertical) wall 52a on the left and right sides of an engine compartment 52 of an automobile body 51. In the following explanation, an example will be given of the case of a front side member 53 having a closed transverse cross-sectional shape which is a rectangle, but the present invention is not limited to this shape, and it can be similarly applied to a member having a tubular body with a closed transverse cross-sectional shape other than a rectangle such as a hexagon or a circle.

As shown in FIG. 29, a tubular member which forms the body 54 of the front side member 53 has a front portion 55 which extends in the fore and aft direction of the vehicle body from one end 54a towards the other end 54b in its axial direction, a sloping portion which extends downwards along a dash panel 59 which is a partition between the engine compartment 52 and a passenger compartment 58, and a rear portion 57 which is continuous with the sloping portion 56 and extends along the lower surface of a floor panel 50 which is connected to the dash panel 59.

Here, the sloping portion 56 refers to the region in which the height of installation of the front side member 53 greatly varies towards the lower surface of the dash panel 59, the front portion 55 refers to the region forward of the sloping portion 56 in the fore and aft direction of the vehicle body, and the rear portion 57 refers to the region at the rear of the sloping portion 56 in the fore and aft direction of the vehicle body.

In a front side member 53 of this embodiment, a portion of the front portion 55 is an unquenched portion which has not undergone quenching, and the remainder of the front portion 53 other than that portion is a high frequency quenched portion which has undergone high frequency quenching. All of the sloping portion 56 is a high frequency quenched portion which has undergone high frequency quenching. A portion of the rear portion 57 is an unquenched portion which has not undergone quenching, and the remainder of the rear portion 57 other than this portion is a high frequency quenched portion which has undergone high frequency quenching. Alternatively, the rear portion 57 is a high frequency quenched portion which has undergone high frequency quenching. Below, this arrangement will be explained with respect to specific examples.

Figure 30:
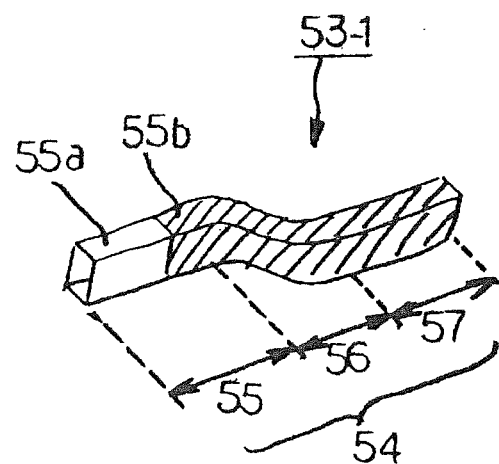
FIG. 30 is an explanatory view showing a first example of a front side member.

FIG. 30 is an explanatory view showing a first example 53-1 of the front side member 53.

As shown in this figure, in this first example 53-1, one each of an unquenched portion 55a and a high frequency quenched portion 55b are alternatingly disposed in the axial direction of the tubular body in the front portion 55, and the entirety of the sloping portion 56 and the rear portion 57 is a high frequency quenched portion. As a result, when impact energy is applied in the axial direction of the body 54 at the time of a collision, deformation by crushing in the axial direction is promoted in the unquenched portion 55a of the front portion 55 without producing an increase in the weight of the front side member 53, the resistance to bending of the sloping portion 56 is increased, and damage to the dash panel 59 is decreased, so the safety of the passenger compartment 58 is increased.

Figure 31:
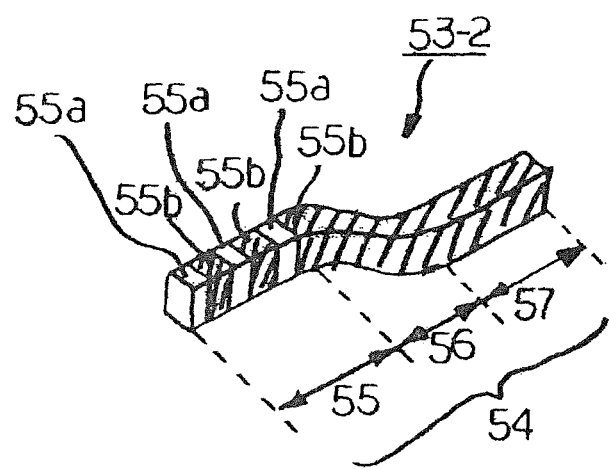
FIG. 31 is an explanatory view showing a second example of a front side member.

FIG. 31 is an explanatory view showing a second example 53-2 of a front side member 53.

As shown in this figure, in this second example 53-2, at least two each (three of each in the illustrated example) of an unquenched portion 55a and a high frequency quenched 55b are alternatingly disposed in the axial direction of the body 4 in the front portion 55, and the entirety of the sloping portion 56 and the rear portion 57 is a high frequency quenched portion. With this structure, when impact energy is applied in the axial direction of the body 54 at the time of a collision, deformation due to crushing in the axial direction is controlled and even promoted in the unquenched portion 55a of the front portion 55 without increasing the weight of the front side member 53, the bending resistance of the sloping portion 56 is increased, and damage to the dash panel 59 is decreased, so the safety of the passenger compartment 58 is increased.

Figure 32:
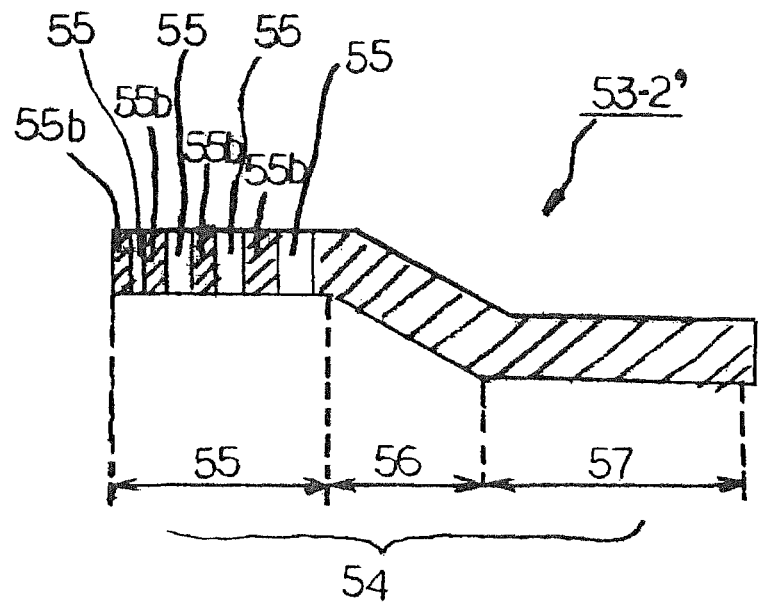
FIG. 32 is an explanatory view showing a preferred form of a second example of a front side member.

FIG. 32 is an explanatory view showing a preferred mode 53-2' of the second example 53-2 of the front side member 53 shown in FIG. 31.

As shown in this figure, the lengths in the axial direction of the body 54 (the direction shown by the arrows in FIG. 4) of the unquenched portion 55a and the high frequency quenched portion 55b in the front portion 5 preferably gradually increase from the front end towards the rear end of the body 54 in order to promote deformation by crushing in the axial direction.

Figure 33:
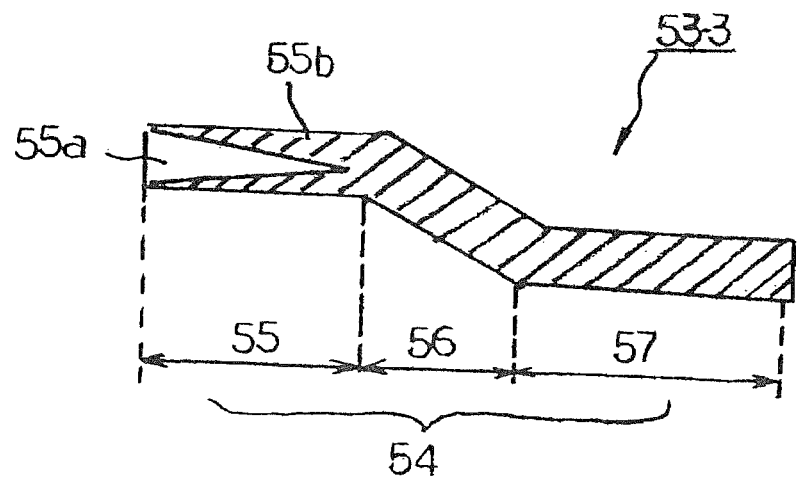
FIG. 33 is an explanatory view showing a third example of a front side member.

FIG. 33 is an explanatory view showing a third example 53-3 of a front side member 53.

As shown in this figure, in the third example 53-3, a high frequency quenched portion 55b in the front portion 55 preferably gradually increases in area from the front end towards the rear end in the axial direction of the body 54, and an unquenched portion 55a in the front portion 55 preferably gradually decreases in area from the front end towards the rear end in the axial direction of the tubular body. As a result, an impact load which is applied to the front side member 53 can be gradually increased, so deformation by crushing in the axial direction in the unquenched portion 55a of the front portion 55 is promoted and resistance to bending of the sloping portion 56 can be increased while decreasing the initial load.

FIGS. 34(a)-34(d) are explanatory views showing a fourth example 53-4, a fifth example 53-5, a sixth example 53-6, and a seventh example 53-7 of a front side member 53.

As shown in FIGS. 34(a)-34(d), in the fourth through seventh examples, one each or two or more each of an unquenched portion 55a and a high frequency quenched 55b are preferably alternatingly disposed in the circumferential direction of the body 54 in the front portion 55 in order to strengthen the front portion 55 while maintaining a balance between the loads acting on the front portion 55 and the sloping portion 56.

Figure 34:
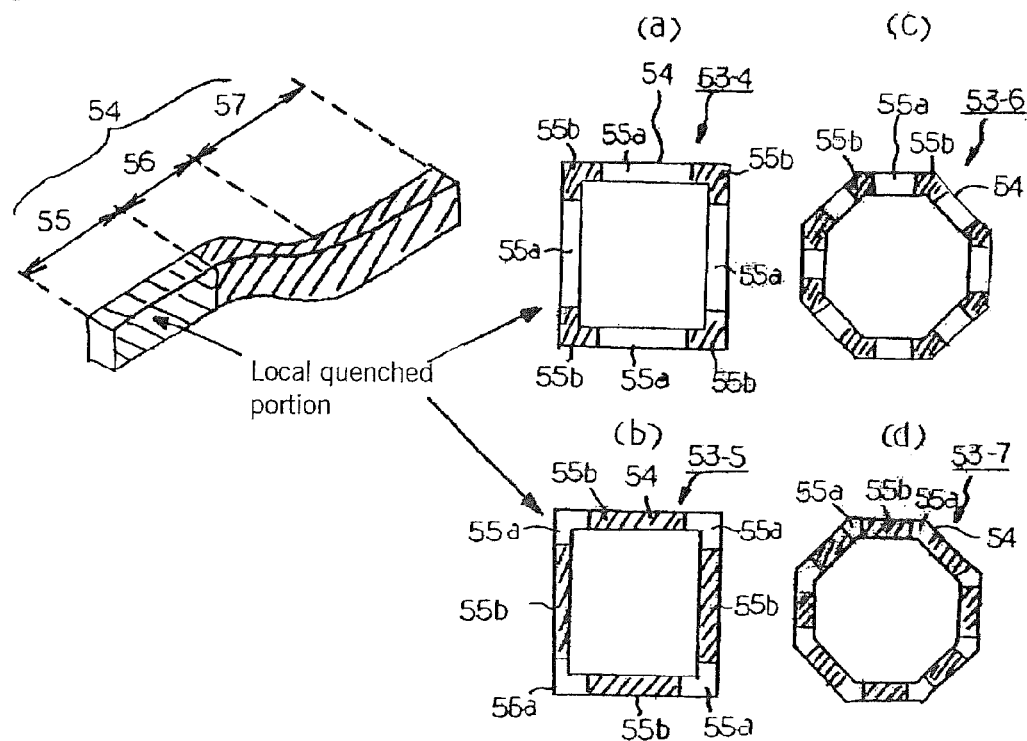
FIGS. 34(a)-34(b) are explanatory views showing fourth through seventh examples of a front side member.

FIGS. 34(a) and 34(b) show a case in which the tubular body has a rectangular transverse cross section, and FIGS. 34(c) and 34(d) show a case in which the tubular body has an octagonal transverse cross section.

As shown in FIGS. 34(a) and 34(c), by providing an unquenched portion 55a in a plane-shaped region of a transverse cross section not including a vertex of a polygon and providing a high frequency quenched portion 55b in a bent region including a vertex of a polygon, resistance to impact loads can be increased.

Conversely, as shown in FIGS. 34(b) and 34(d), by providing an unquenched portion 55a in a bent region including a vertex of a polygon and providing a high frequency quenched portion 55b in a plane-shaped region including a vertex of a polygon, the initial load can be increased, the impact load can be controlled, and deformation by crushing in the axial direction can be promoted.

Figure 35:
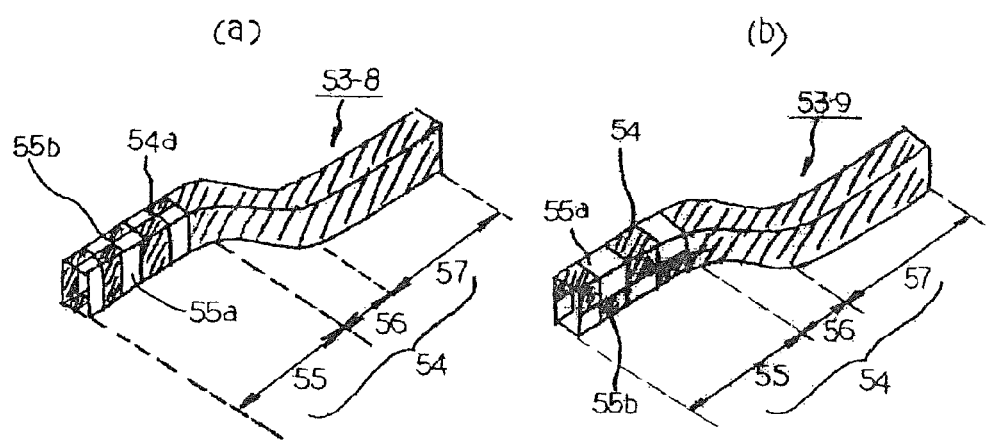
FIGS. 35(a) and 35(b) are explanatory views showing eighth and ninth examples of a front side member.

FIGS. 35(a) and 35(b) are explanatory views showing an eighth example 53-8 and a ninth example 53-9 of a front side member 53.

As shown in FIG. 35(a), when the polygonal transverse cross-sectional shape of the body 54 has a pair of opposing generally vertical surfaces, by providing an unquenched portion 55a in one of the generally vertical surfaces and providing a high frequency quenched portion 55b in the opposing generally vertical surface and alternatingly disposing an unquenched 55a and a high frequency quenched 55b in the axial direction of the body 54, bending in a desired widthwise direction of a vehicle body can be induced in a front side member 53 to which an impact load is supplied, which is desirable.

As shown in FIG. 35(b), when the transverse cross-sectional shape of the body 54 is a polygon having a pair of opposing generally horizontal surfaces, by providing an unquenched portion 55a in one of the generally horizontal surfaces and providing a high frequency quenched portion 55b in the opposing generally horizontal surface and alternatingly disposing an unquenched portion 55a and a high frequency quenched portion 55b in the axial direction of the body 54, bending in a desired vertical direction of the vehicle body can be induced in a front side member 53 when an impact load is applied, which is desirable.

Figure 36:
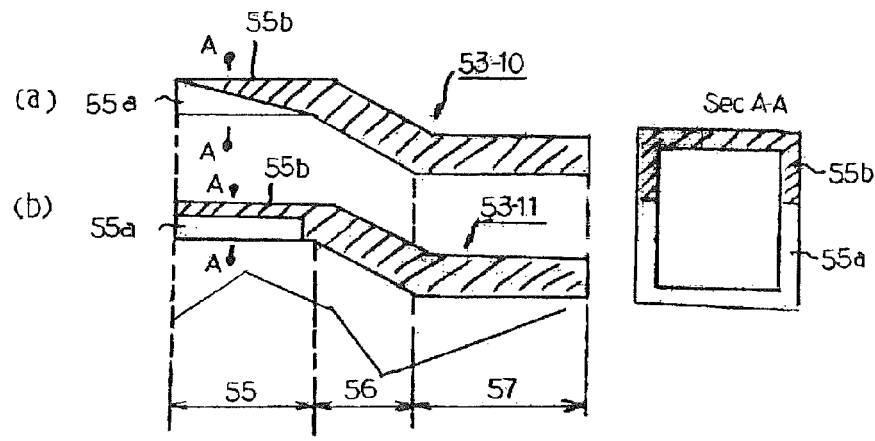
FIGS. 36(a) and 36(b) are explanatory views showing tenth and eleventh examples of a front side member.

FIGS. 36(a) and 36(b) are explanatory views of a tenth example 53-10 and an eleventh example 53-11 of a front side member 53. In both figures, the right hand view is a cross section taken along line A-A of the front portion 55. FIG. 35(a) shows the case in which the area of the high frequency quenched portion 55b gradually increases in the axial direction of the tubular body, and FIG. 35(b) shows the case in which it is constant.

As shown in FIGS. 36(a) and 36(b), by providing an unquenched portion 55a on the lower side of the transverse cross section of a tubular body and providing a high frequency quenched portion 55b in the remaining region on the upper side, bending deformation of the body 54 when an impact load is applied can be suppressed, which is desirable.

Figure 37:
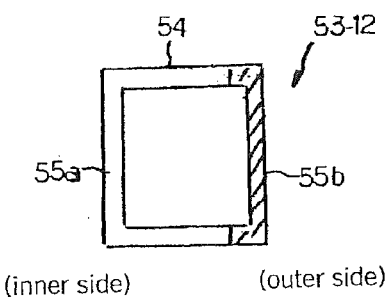
FIG. 37 is an explanatory view showing a twelfth example of a front side member.

FIG. 37 is an explanatory view showing a twelfth example 53-12 of a front side member 53.

As shown in FIG. 37, by providing an unquenched portion 55a in a region on the inner side of a vehicle body in a transverse cross section of the tubular body and providing a high frequency quenched portion 55b in a region on the outer side of the vehicle body other than the region on the inner side of the vehicle body, bending of the tubular body 54 towards the inner side of the vehicle body when an impact load is applied and a decrease in the impact absorbing ability at an early stage can be suppressed, which is desirable.

In the above-described first example 53-1 through twelfth 53-12 of a front side member 53, the entirety of the rear portion 57 is a high frequency quenched portion. However, it is also possible to provide an unquenched portion in a portion of the rear portion 57.

Figure 38:
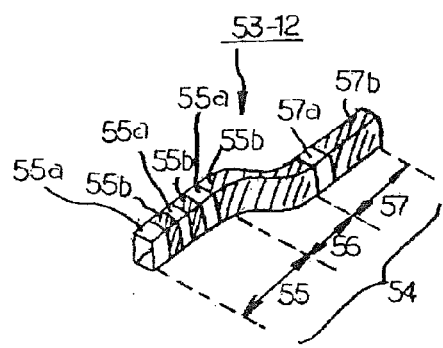
FIG. 38 is an explanatory view showing a thirteenth example of a front side member in which one unquenched portion is formed in the axial direction of a body from the front end of a rear end portion in the second example of a front side member shown in FIG. 31.

FIG. 38 is an explanatory view of a thirteenth example 53-13 in which a single unquenched portion 57a is formed at the front end of the rear portion 57 in the axial direction of the body 54 in the second example 53-2 of a front side member 53 shown in FIG. 31. It is also possible to provide a plurality of unquenched portions 57a in the axial direction of the tubular body.

According to this thirteenth example 53-13, in addition to the effect of the second example of a front side member 53 shown in FIG. 31, deformation by collapse in the axial direction in the rear end portion 57 can be promoted, and damage to the floor panel 50 and the passenger compartment 58 can be further decreased.

According to the above-described first example 53-1 through thirteenth example 53-13, portions of the front side member 53 can be increased in strength by high frequency quenching, and a suitable balance in strength can be obtained with respect to the unquenched portions. Therefore, deformation by collapse in the axial direction can be promoted, and as a result, a front side member 53 can be provided which has both high strength and impact absorbing properties which could not be obtained in the past.

After being formed, portions of the front side member 53 sometimes are subjected to mechanical working such as punching for forming holes or cutting to form notches. If high frequency quenching is carried out on portions where such working is carried out, mechanical working becomes difficult due to a marked increase in hardness. In addition, the rear portion of a front side member 53 is joined by welding to the bottom surface of a floor panel 50, so high frequency quenching is preferably not carried out in that portion.

Figure 39:
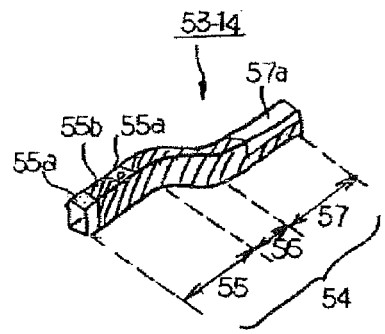
FIG. 39 is an explanatory view showing a fourteenth example of a front side member in which an unquenched portion is provided in a region including a punched portion which has been subjected to punching and welded portion which has been welded.

FIG. 39 is an explanatory view showing a fourteenth example 53-14 of a front side member 53 in which unquenched portions 55a and 57a are provided in regions including a portion to undergo punching and a portion to undergo welding.

In the fourteenth example 53-14 shown in FIG. 39, an unquenched portion 55a is provided in a region including a portion to be punched in the front portion 55 and an unquenched 57a is provided in a portion of the rear portion 57 to be welded to a floor panel. This fourteenth example 53-14 has excellent weldability and formability, so it can actually be mass produced on an industrial scale.

Next, a method of manufacturing a front side member 53 according to the present invention will be explained.

A front side member 53 according to the present invention can be manufactured by a bending method explained with respect to FIGS. 1-22. As a result, a front side member 53 according to the present invention can be manufactured with high productivity and good dimensional accuracy while easily forming unquenched portions and high frequency quenched portions with certainty.

In contrast, if a tubular body having a closed cross-sectional structure and the above-described front portion 5, sloping portion 6, and rear portion 7 is formed by a suitable conventional means, the resulting tubular body is bent to a desired shape, and then high frequency quenching is carried out by conventional means, due to the high frequency quenching, it becomes difficult to guarantee the dimensional accuracy of the bent portion. Therefore, it is virtually impossible to manufacture a front side member 53 according to the present invention.

In this manner, according to this embodiment, it is possible to provide a front side member having both a high strength and light weight and impact absorbing properties which could not be obtained in the past as well as excellent weldability and formability, as a result of which the front side member can actually be mass produced on an industrial scale.

Third Embodiment

A third embodiment will be explained.

Figure 40:
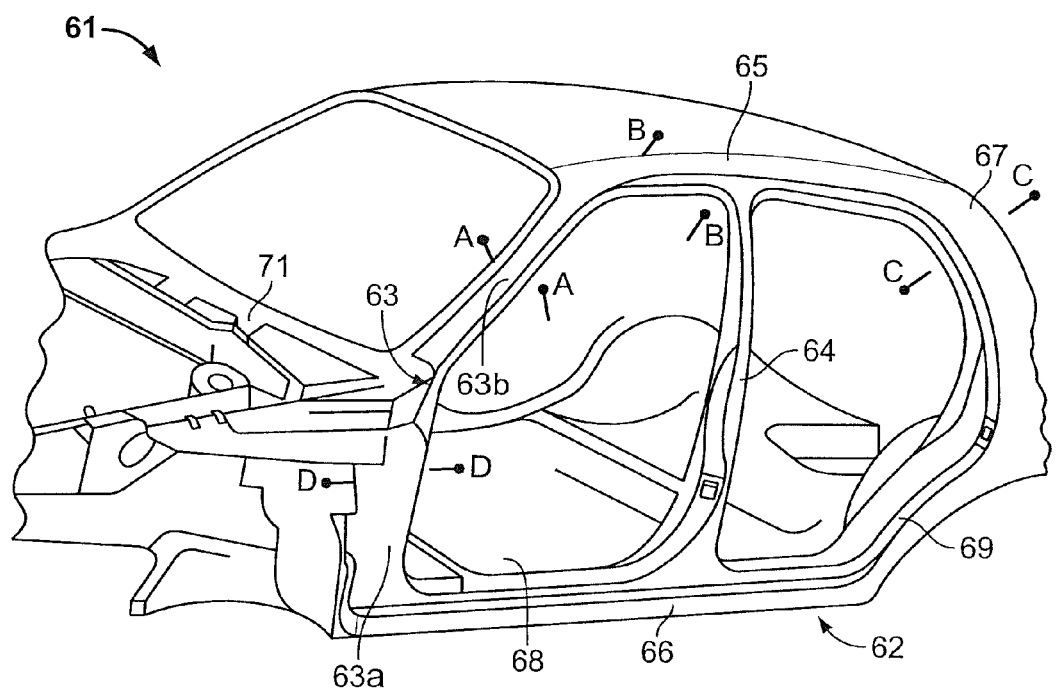
FIG. 40 is an explanatory view showing one example of a side structure for an automobile body of a first embodiment.

FIG. 40 is an explanatory view showing an example of a side structure 62 of an automobile body 61 of this embodiment.

This side structure 62 includes at least an A-pillar 63, a B-pillar 64, a roof rail side member 65, a side sill 66, and a C-pillar 67.

The A-pillar 63 comprises a first portion 63a which has a closed cross section and which is connected to and extends upwards from a side sill 66, which is secured to both widthwise ends of the floor panel 68. It also has a second portion 63b which has a closed cross section and which is continuous with the first portion 63a and extends along a slope.

The roof rail side member 65 is a tubular member which has a closed cross section. It is continuous with the second portion 63b of the A-pillar 63 and is connected to the upper portion of the B-pillar 64.

The lower portion of the B-pillar 64 is connected to the side sill 66, and the roof rail side member 65 is supported by the side sill 66 and the floor panel 68 through the B-pillar 64. The rear end of the roof rail side member 65 is connected to the C-pillar 67. The C-pillar 67 is connected to the rear fender.

In this manner, the side structure 62 of this embodiment is constituted by a skeleton formed by various structural members having a closed cross section.

In this embodiment, a side reinforcing member 70 is disposed inside the second portion 63b of the A-pillar 63 and the roof rail side member 65 and extends to the rear of the connection with the B-pillar 64.

Figure 41:
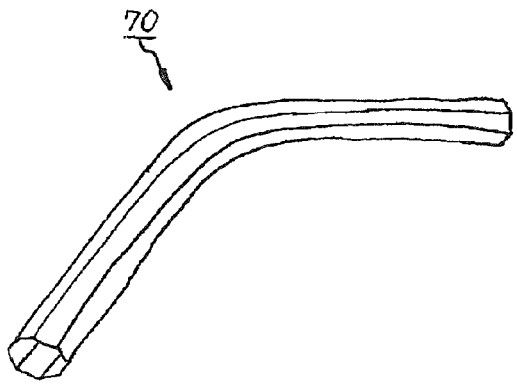
FIG. 41 is an explanatory view showing one example of a side reinforcing member of a first embodiment.

FIG. 41 is an explanatory view showing one example of this side reinforcing member 70.

This side reinforcing member 70 has a closed cross-sectional shape comprising an octagon is bent three-dimensionally. It has a one-piece structure which has been subjected to high frequency quenching.

Figure 42:
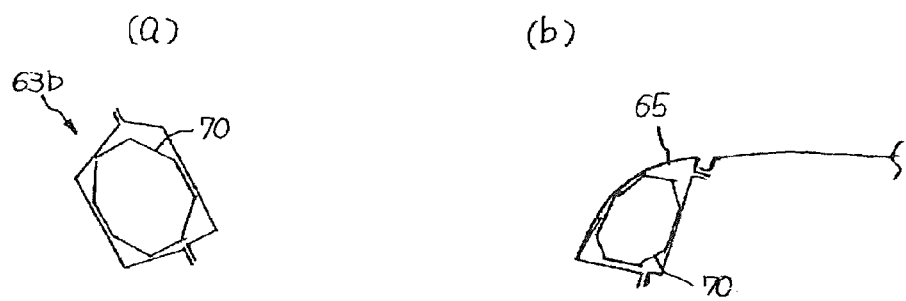
FIG. 42(a) shows cross section A-A in FIG. 40.
FIG. 42(b) shows cross section B-B in FIG. 40.

FIG. 42(a) shows cross section A-A in FIG. 40, and FIG. 42(b) shows cross section B-B in FIG. 40. As shown in FIG. 42, the side reinforcing member 70 is disposed inside the second portion 63b of the A-pillar 63 and inside the roof rail side member 65 and it extends to the rear of the connection with the B-pillar 65.

Quenching treatment is preferably not carried out in the region of the side reinforcing member 70 which is welded for connection to the B-pillar 64 in order to guarantee workability and weldability.

In addition, quenching is preferably not carried out on the front end of the side reinforcing member 70 in order to improve weldability when the front end is welded to a portion of the engine compartment.

The side reinforcing member 70 can be manufactured by the hot three-dimensional bending method explained while referring to FIGS. 1-22. By this method, a side reinforcing member 70 according to the present invention can be formed with high productivity and good dimensional accuracy while forming unquenched portions and quenched portions easily and with certainty.

In order to dispose the side reinforcing member 70 inside the second portion 63b of the A-pillar 63 and inside the roof rail side member 65 so as to extend to the rear of the connection with the B-pillar 64, the front end of the B-pillar reinforcing member can be formed so as to cover the side reinforcing member 70, and assembly can be carried out by a usual arc welding process or spot welding process for an automobile body.

Roughly the entirety of the side reinforcing member 70 has undergone high frequency quenching, so it has an extremely high strength, and it can exhibit sufficient performance as a reinforcing member even if its transverse cross-sectional area is set to a small value. Therefore, an increase in weight by adding the side reinforcing member 70 can be minimized.

The side reinforcing member 70 can have a one-piece structure, so the number of parts forming the reinforcing member can be decreased, and as a result, the manufacturing costs of an automobile body 61 can be decreased.

In this manner, according to this embodiment, an increase in the strength and a decrease in the weight of the side structure of an automobile body 61 and a decrease in the manufacturing costs of an automobile body 61 can be achieved to a high degree.

Fourth Embodiment

A fourth embodiment will be explained. In this explanation, portions which are different from in the above-described third embodiment will be explained, and portions which are the same are identified by the same reference numbers, so a repeated explanation thereof will be omitted.

In this embodiment, a side reinforcing member 70-1 is disposed inside the second portion 63b of the A-pillar 63, the roof rail side member 65, and the C-pillar 67.

Figure 43:
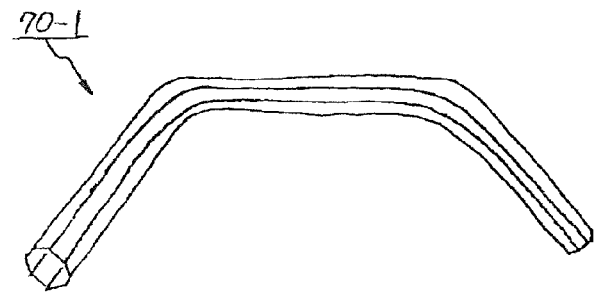
FIG. 43 is an explanatory view showing a side reinforcing member of a second embodiment.
Figure 44:
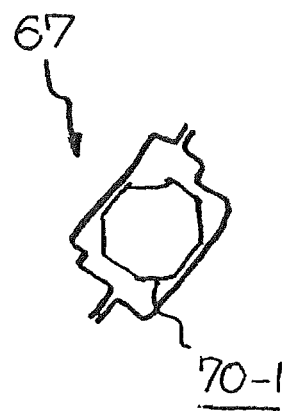
FIG. 44 is a cross-sectional view along line C-C in FIG. 40.
Figure 45:
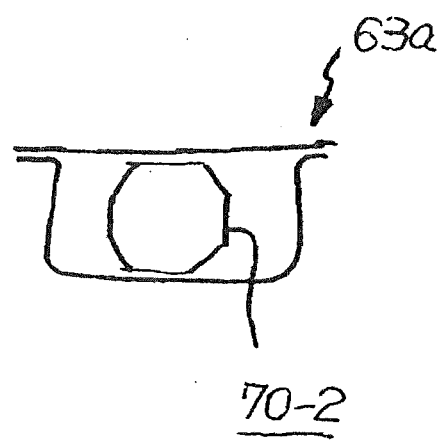
FIG. 45 is a cross-sectional view along line D-D in FIG. 40.

FIG. 43 is an explanatory view showing this side reinforcing member 70-1. FIG. 44 shows cross section C-C in FIG. 40. As shown in FIG. 43 and FIG. 45, in this embodiment, the side reinforcing member 70-1 is provided inside the second portion 63b of the A-pillar, inside the roof rail side member 65, and inside the C-pillar 67.

In brief, the side reinforcing member 70-1 of this embodiment is the side reinforcing 70 of the above-described first embodiment which has been elongated so as to be housed inside the C-pillar 67. It is otherwise entirely the same as the third embodiment.

In order to dispose the side reinforcing member 70-1 in this manner, the front end of the B-pillar reinforcing member can be formed so as to cover the side reinforcing member 70-1, and assembly can be carried out by a usual arc welding process or spot welding process for an automobile body.

This side reinforcing member 70-1 undergoes high frequency quenching over roughly its entire length, so it has extremely high strength, and it can adequately function as a reinforcing member even if it has a small cross-sectional area. Therefore, the increase in weight caused by adding this side reinforcing member 70-1 can be minimized.

This side reinforcing member 70-1 can be manufactured as a one-piece member, so the number of parts forming the reinforcing member can be decreased, and the manufacturing costs of an automobile body 61 can thereby be decreased.

In this manner, according to this embodiment, it is possible to achieve further increases in strength and decreases in weight of the side structure 62 of an automobile body 61 as well as a decrease in the manufacturing costs of an automobile body 61 to a high degree.

Fifth Embodiment

FIG. 45 shows cross section D-D of FIG. 40.

In this embodiment, the front portion of the side reinforcing member 70 of the third embodiment is elongated towards the lower side of an automobile body 61 to obtain a side reinforcing member 70-2 of this embodiment which is also present inside the first portion 63a of the front pillar 63.

By using this side reinforcing member 70-3, in addition to the effects of the side reinforcing member 70 of the first embodiment, the dash panel can be reinforced at the time of a front impact.

The invention claimed is:

1. A front side member having a body formed from a tubular steel body which has a closed cross section and which is constituted by a single member in the axial direction, said body having, from one end towards the other end in the axial direction, a front portion which extends in the fore and aft direction of a vehicle body, a sloping portion which is continuous with the front portion and which slopes downwards along a dash panel, and a rear portion which is continuous with the sloping portion and which extends along the bottom surface of a floor panel which is joined to the dash panel, characterized in that a portion of the front portion is a first unquenched portion which has not undergone quenching treatment and the remainder other than that portion is a first high frequency quenched portion which has undergone high frequency quenching, all of the sloping portion is a second high frequency quenched portion which has undergone high frequency quenching, and a portion of the rear portion is second unquenched portion which has not undergone quenching, and the remainder other than that portion is a third high frequency quenched portion which has undergone high frequency quenching.

2. The front side member as set forth in claim 1 wherein in the front portion, at least one of each of the first unquenched portion and the first high frequency quenched portion are alternatingly disposed in the axial direction of the tubular steel body.

3. The front side member as set forth in claim 2 wherein the axial length of each of the first unquenched portion and the first high frequency quenched portion gradually increases from the front end towards the rear end of the tubular steel body.

4. The front side member as set forth in claim 1 wherein the first high frequency quenched portion in the front portion gradually increases in area in the axial direction of the tubular steel body from the front end towards the rear end, and the first unquenched portion in the front portion gradually decreases in area in the axial direction of the tubular steel body from the front end towards the rear end.

5. The front side member as set forth in claim 1 wherein in the front portion, at least one of each of the first unquenched portion and the first high frequency quenched portion is alternatingly disposed in the circumferential direction of the tubular steel body.

6. The front side member as set forth in claim 5 wherein the tubular steel body has a polygonal transverse cross-sectional shape, the first unquenched portion is provided in a region not including a vertex of the polygon, and the first high frequency quenched portion is provided in a region including a vertex of the polygon.

7. The front side member as set forth in claim 5 wherein the tubular steel body has a polygonal transverse cross-sectional shape, the first unquenched portion is provided in a region including a vertex of the polygon, and the first high frequency quenched portion is provided in a region not including a vertex of the polygon.

8. The front side member as set forth in claim 5 wherein the tubular steel body has a polygonal transverse cross-sectional shape and the polygon has a pair of opposing generally horizontal surfaces, the first unquenched portion is provided in one of the generally horizontal surfaces, and the first high frequency quenched portion is provided in the other generally horizontal surface.

9. The front side member as set forth in claim 5 wherein the tubular steel body has a polygonal transverse cross-sectional shape and the polygon has a pair of opposing generally vertical surfaces, the first unquenched portion is provided in one of the generally vertical surfaces, and the first high frequency quenched portion is provided in the other of the generally vertical surfaces.

10. The front side member as set forth in claim 5 wherein the first unquenched portion is provided in a region on the lower side of a transverse cross section of the tubular steel body and the first high frequency quenched portion is provided in a region on the upper side excluding the region on the lower side.

11. The front side member as set forth in claim 5 wherein the first unquenched portion is provided in a region on an inner side of a vehicle body in a transverse cross section of the tubular steel body, and the first high frequency quenched portion is provided in a region on the outer side of the tubular steel body excluding the region on the inner side of the vehicle body.

12. A front side member as set forth in claim 1 wherein in the rear portion, at least one of each of the second unquenched portion and the third high frequency quenched portion is alternatingly disposed in the axial direction of the tubular steel body from the front end of the rear portion.

13. The front side member as set forth in claim 1 wherein the first unquenched portion is provided in a region including a punched portion which is worked by punching and second unquenched portion is provided in a region including a welded portion which is welded.

14. The front side member as set forth in claim 1 wherein the tubular steel body does not have an outwardly-extending flange.

15. A front side member as set forth in claim 1 wherein the tensile strength of the first, second and third high frequency quenched portions is greater than 1100 MPa or 600-1100 MPa, and the tensile strength of the first and second unquenched portions is less than 600 MPa.

* * * * *